United States Patent
Xiao et al.

(10) Patent No.: US 12,138,540 B2
(45) Date of Patent: Nov. 12, 2024

(54) METHOD, APPARATUS, DEVICE, AND STORAGE MEDIUM, AND PROGRAM PRODUCT FOR DISPLAYING VOTING RESULT

(71) Applicant: TENCENT TECHNOLOGY (SHENZHEN) COMPANY LIMITED, Shenzhen (CN)

(72) Inventors: Qinghua Xiao, Shenzhen (CN); Xiaohao Liu, Shenzhen (CN); Peicheng Liu, Shenzhen (CN); Shuai Jiang, Shenzhen (CN); Mengtong Liang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 43 days.

(21) Appl. No.: 17/824,135

(22) Filed: May 25, 2022

(65) Prior Publication Data
US 2022/0280870 A1 Sep. 8, 2022

Related U.S. Application Data

(63) Continuation of application No. PCT/CN2021/126844, filed on Oct. 27, 2021.

(30) Foreign Application Priority Data

Jan. 13, 2021 (CN) .......................... 202110042235.7

(51) Int. Cl.
A63F 13/45 (2014.01)
A63F 13/533 (2014.01)
A63F 13/5375 (2014.01)

(52) U.S. Cl.
CPC .......... *A63F 13/5375* (2014.09); *A63F 13/45* (2014.09); *A63F 13/533* (2014.09)

(58) Field of Classification Search
CPC .......... A63F 13/44; A63F 13/45; A63F 13/47; A63F 13/50; A63F 13/52; A63F 13/53;
(Continued)

(56) References Cited

U.S. PATENT DOCUMENTS

2002/0160824 A1 10/2002 Goto et al.
2013/0267328 A1 10/2013 Heisler et al.
(Continued)

FOREIGN PATENT DOCUMENTS

CN 106792229 A 5/2017
CN 108126345 A 6/2018
(Continued)

OTHER PUBLICATIONS

China National Intellectual Property Administration (CNIPA) Office Action 1 for 202110042235.7 Oct. 25, 2022 13 Pages (including translation).
(Continued)

*Primary Examiner* — Omkar A Deodhar
(74) *Attorney, Agent, or Firm* — ANOVA LAW GROUP PLLC

(57) ABSTRACT

A method for displaying a voting result includes: receiving a selection operation signal for an action plan from a virtual object in a target camp; displaying a vote counting area corresponding to the action plan in an interface of the terminal device, the vote counting area being used for displaying voting on the action plan, and the vote counting area comprising sub-areas in a to-be-selected state; receiving a voting operation signal for the action plan, the voting operation signal indicating a support status for the action plan; adjusting one of the sub-areas from the to-be-selected
(Continued)

state to a selected state with a display characteristic corresponding to the support status according to the voting operation signal, wherein different support status corresponds to different display characteristics for the sub-areas; and displaying a voting result corresponding to the action plan based on the voting operation signal.

19 Claims, 16 Drawing Sheets

(58) Field of Classification Search
CPC .. A63F 13/533; A63F 13/537; A63F 13/5372; A63F 13/5375; A63F 13/55; A63F 13/56; A63F 13/70
See application file for complete search history.

(56) References Cited

U.S. PATENT DOCUMENTS

| | | | |
|---|---|---|---|
| 2014/0256409 | A1 | 9/2014 | Wood et al. |
| 2014/0335953 | A1 | 11/2014 | Marsland et al. |
| 2017/0106278 | A1* | 4/2017 | Ishizawa ............... A63F 13/80 |
| 2017/0340963 | A1* | 11/2017 | Bucher ................ A63F 13/25 |
| 2019/0371273 | A1 | 12/2019 | Benedetto et al. |
| 2021/0213360 | A1* | 7/2021 | Osman ................ A63F 13/537 |
| 2021/0394073 | A1* | 12/2021 | Osman ................ A63F 13/87 |
| 2022/0161133 | A1* | 5/2022 | Kamiguchi ........... A63F 13/47 |

FOREIGN PATENT DOCUMENTS

| | | |
|---|---|---|
| CN | 108553904 A | 9/2018 |
| CN | 109276885 A | 1/2019 |
| CN | 110694266 A | 1/2020 |
| CN | 112156478 A | 1/2021 |
| CN | 112691370 A | 4/2021 |
| JP | 2002325975 A | 11/2002 |
| TW | 585795 B | 5/2004 |

OTHER PUBLICATIONS

"bilibili", "Five Tone Pornography", Nov. 14, 2020 (Nov. 14, 2020).
Taiwan Intellectual Property Office Examination report for Application No. 110143422 Jul. 13, 2022 13 pages (including translation).
The World Intellectual Property Organization (WIPO) International Search Report for PCT/CN2021/126844 Jan. 26, 2022 7 Pages (including translation).
Game Jian Jian, "LOL: Five votes to surrender in 15 minutes and four in 20 minutes. There are actually drawbacks to such a surrender mechanism." baijiahao.baidu.com, Mar. 25, 2020, Retrieved from the Internet:URL: https://www.cunman.com/new/d8d24793b7b44ab78d03509l6214ec9b. 16 pages (including translation).
The Japan Patent Office (JPO) Notification of Reasons for Refusal for Application No. 2022-556511 and Translation Sep. 5, 2023 10 Pages.
[Among US] You'll understand when you see this! Strategy for beginners! «amonguasu/Amanguas», Youtube [online][video], Nov. 26, 2020, Internet <URL: https://www.youtube.com/watch?v=4K678Om75ZA>, especially 1:11-1:15, 3:16-3:40, [Date retrieved: Aug. 28, 2023].
Intellectual Property Office of Singapore Search Report for Application No. 11202250820M Aug. 6, 2024 3 pages.
Korean Intellectual Property Office (KIPO) Office Action 1 for Application No. 2022-7029887 Jul. 4, 2024 11 Pages (including translation).
"Malphite and Serenchang Encounter Again", Internet Naver TV Posted Video, Oct. 18, 2020 (Oct. 18, 2020), <https://tv.naver.com/v/16279707>.
"How to play Among Us well? Master with just this one video! / Strategy", Internet YouTube video, Aug. 21, 2020 (Aug. 21, 2020), <https://www.youtube.com/watch?v=ulBe8sk-QZA>.

* cited by examiner

METHOD, APPARATUS, DEVICE, AND STORAGE MEDIUM, AND PROGRAM PRODUCT FOR DISPLAYING VOTING RESULT

CROSS-REFERENCES TO RELATED APPLICATIONS

This application is a continuation application of PCT Patent Application No. PCT/CN2021/126844, filed on Oct. 27, 2021, which claims priority to Chinese Patent Application No. 202110042235.7, filed on Jan. 13, 2021 and entitled "METHOD, APPARATUS, DEVICE, STORAGE MEDIUM, AND PROGRAM PRODUCT FOR DISPLAYING VOTING RESULT", the entire contents of both of which are incorporated herein by reference.

FIELD OF THE TECHNOLOGY

Embodiments of the present disclosure relate to the field of virtual environments, and in particular, to a method, apparatus, device, and storage medium for displaying a voting result.

BACKGROUND OF THE DISCLOSURE

In an application based on a virtual environment, a master virtual object controlled by a user forms a camp with other virtual objects, and conducts a virtual game against another camp formed by virtual objects. At least one of the virtual objects in the same camp may propose an action plan for the camp according to the change of the situation in the virtual game.

SUMMARY

Embodiments of the present disclosure provide a method, apparatus, device, storage medium, and program product for displaying a voting result, which can improve the efficiency of displaying a voting result. The technical solutions are as follows.

According to an aspect, a method for displaying a voting result is provided. The method is executed by a terminal device. The method includes: receiving a selection operation signal for an action plan from a virtual object in a target camp; displaying a vote counting area corresponding to the action plan in an interface of the terminal device, the vote counting area being used for displaying voting on the action plan, and the vote counting area comprising sub-areas in a to-be-selected state; receiving a voting operation signal for the action plan, the voting operation signal indicating a support status for the action plan; adjusting one of the sub-areas from the to-be-selected state to a selected state with a display characteristic corresponding to the support status according to the voting operation signal, wherein different support status corresponds to different display characteristics for the sub-areas; and displaying a voting result corresponding to the action plan based on the voting operation signal.

According to another aspect, an apparatus for displaying a voting result is provided. The apparatus includes: a receiving module, configured to receive a selection operation signal for an action plan from a virtual object in a target camp; a display module, configured to display a vote counting area corresponding to the action plan in an interface of the terminal device, the vote counting area being used for displaying voting on the action plan, and the vote counting area including sub-areas in a to-be-selected state; the receiving module being further configured to receive a voting operation signal for the action plan, the voting operation signal indicating a support status for the action plan; and an adjustment module, configured to adjust one of the sub-areas from the to-be-selected state to a selected state with a display characteristic corresponding to the support status according to the voting operation signal, wherein different support status corresponds to different display characteristics for the sub-areas; the display module being further configured to display a voting result corresponding to the action plan based on the voting operation signal.

According to another aspect, a computer device is provided. The computer device includes a processor and a memory, the memory storing at least one instruction, at least one program, a code set, or an instruction set, the at least one instruction, the at least one program, the code set, or the instruction set being loaded and executed by the processor to implement the method for displaying a voting result according to the above embodiments.

According to another aspect, a non-transitory computer-readable storage medium is provided. The computer-readable storage medium stores at least one instruction, at least one program, a code set, or an instruction set, the at least one instruction, the at least one program, the code set, or the instruction set being loaded and executed by a processor to implement: receiving a selection operation signal for an action plan from a virtual object in a target camp; displaying a vote counting area corresponding to the action plan in an interface of the terminal device, the vote counting area being used for displaying voting on the action plan, and the vote counting area comprising sub-areas in a to-be-selected state; receiving a voting operation signal for the action plan, the voting operation signal indicating a support status for the action plan; adjusting one of the sub-areas from the to-be-selected state to a selected state with a display characteristic corresponding to the support status according to the voting operation signal, wherein different support status corresponds to different display characteristics for the sub-areas; and displaying a voting result corresponding to the action plan based on the voting operation signal.

The technical solutions provided in the embodiments of the present disclosure include at least the following beneficial effects:

The vote counting area is displayed corresponding to the action plan, and when voting signals are received, voting options selected by target virtual objects are displayed in the sub-areas based on the voting signals, and a voting result is further displayed. The sub-areas in the vote counting area correspond to the virtual objects in the target camp. By displaying support statuses of the virtual objects for the action plan in the sub-areas and finally displaying a voting result for the action plan according to a content in the vote counting area, the efficiency of displaying the final result of voting is improved, thereby improving the players' sense of experience in a virtual game.

DESCRIPTION OF EMBODIMENTS

Figure 1:
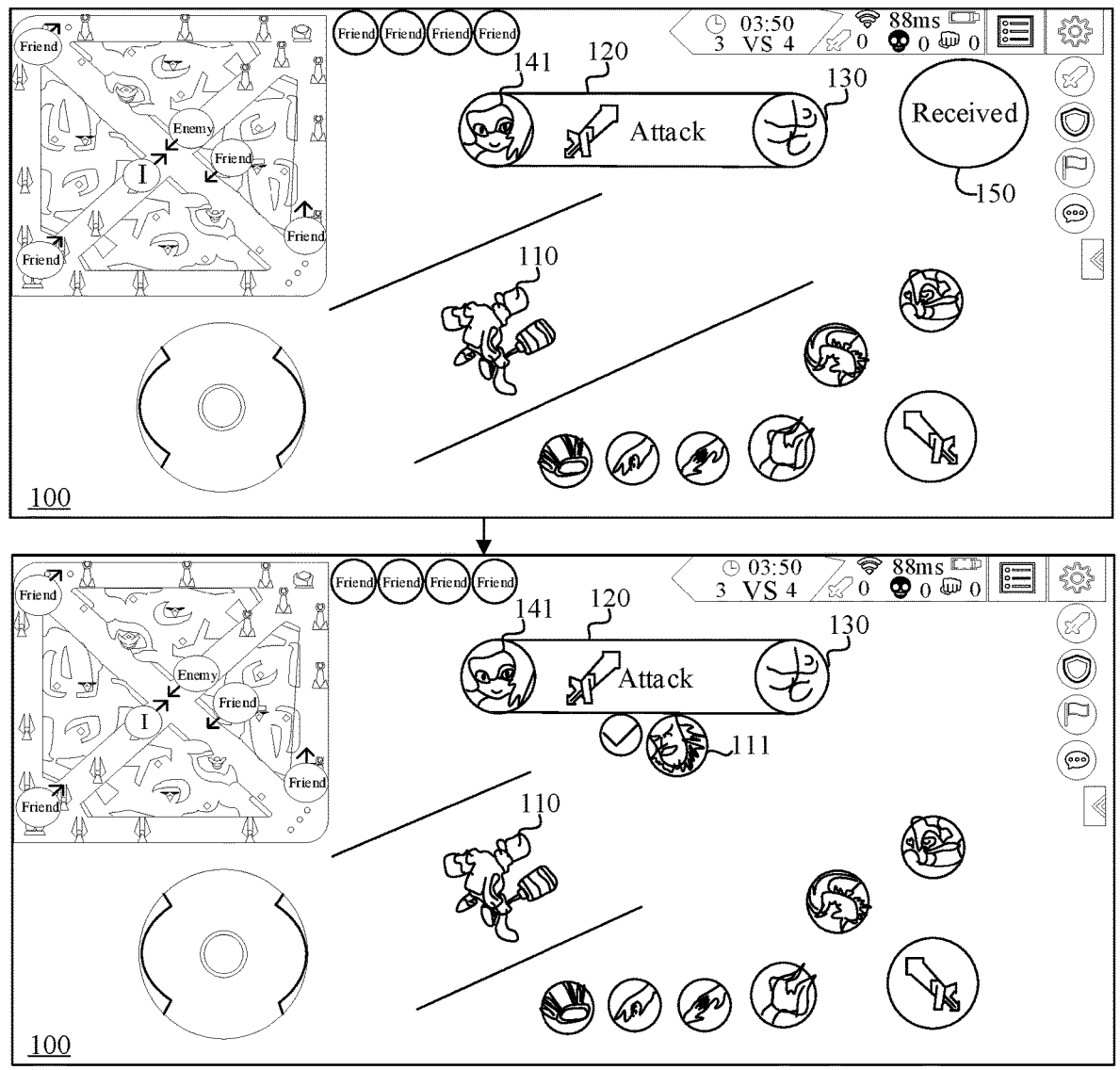
FIG. 1 is a schematic diagram of a method for displaying a voting result in the related art.

A game based on a virtual environment includes maps of one or more game worlds. The virtual environment in the game simulates scenes in the real world. A user can control a master virtual object in the game to perform actions in the virtual environment such as walking, running, jumping, shooting, combating, driving, being attacked by other virtual objects, being injured by the virtual environment, and attacking other virtual objects, which has relatively high interactivity. In addition, a plurality of users can form a team online to perform an arena game.

In the present disclosure, a virtual object is a virtual object playing a virtual game. The virtual game is a game generated in an application and having virtual objects. In some embodiments, a game goal is set for the virtual game. In one example, the virtual game includes at least one virtual object controlled by the user.

In the virtual game, a victory condition for the master virtual object is to eliminate all hostile virtual objects, and a defeat condition for the master virtual object is that the health points of the master virtual object reach 0. This game may also be referred to as a Player Versus Environment (PVE) game.

In another example, in the virtual game, the victory condition for the master virtual object is to eliminate all virtual objects that have established a hostile relationship with the master virtual object, and a defeat condition for the master virtual object is that the master virtual object and virtual objects that have established a cooperative relationship with the master virtual object have all been eliminated. This game may also be referred to as a Player Versus Player (PVP) game.

In the present disclosure, regardless of a PVP game or a PVE game, the victory condition of the game also includes but is not limited to at least one of obtaining a specified number of game resources, a state parameter of the virtual object reaching a parameter threshold, or the number of virtual props destroyed reaching a number threshold; the defeat condition for the game further includes at least one of a game duration reaching a time threshold, the number of hostile virtual objects reaching a number threshold, or a state parameter of the virtual object reaching a parameter threshold. The game victory condition and the game defeat condition of the virtual game are not limited in the embodiments of the present disclosure.

Multiplayer Online Battle Arena Games (MOBA) is an arena in which different virtual teams on at least two opposing camps occupy respective map regions in a virtual environment, and compete against each other using a specific victory condition as a goal. The victory conditions include, but are not limited to at least one of occupying forts or destroy forts of the opposing camps, killing virtual objects in the opposing camps, ensure own survivals in a specified scenario and time, seizing a specific resource, and outscoring the opponent within a specified time.

In MOBA games, the user's master virtual object interacts with other virtual objects in the same camp to exchange opinions. In a virtual game, in order to summarize the opinions of all players, the opinions of all the players are usually determined by voting, and then an action plan is determined for the virtual camp of each player in the virtual game.

For example, referring to FIG. 1, a virtual game screen 100 includes a first virtual object 110. The first virtual object 110 belongs to a first camp in the virtual game. A second virtual object in the first camp proposes an action plan 120 for the first camp. The action plan 120 is to launch an attack on a hostile virtual object 130. A second virtual object identifier 141 corresponding to the second virtual object is displayed on a peripheral side of the action plan 120 to indicate that the action plan 120 is proposed by the second virtual object. After the second virtual object proposes the action plan, an agreement sign 150 corresponding to the action plan is displayed in the virtual game screen 100.

When needing to agree to the action plan 120, the first virtual object 110 operates on the agreement sign 150 to inform the other virtual objects of the first camp know that the first virtual object 110 agrees to the action plan 120. In this case, a first virtual object identifier 111 corresponding to the first virtual object 110 is displayed on a peripheral side of the action plan 120, and at the same time, the display of the agreement sign 150 is canceled.

However, in the related art, virtual objects of the same camp can only know which virtual objects agree to the action plan, but cannot determine a final action decision of the camp.

Figure 2:
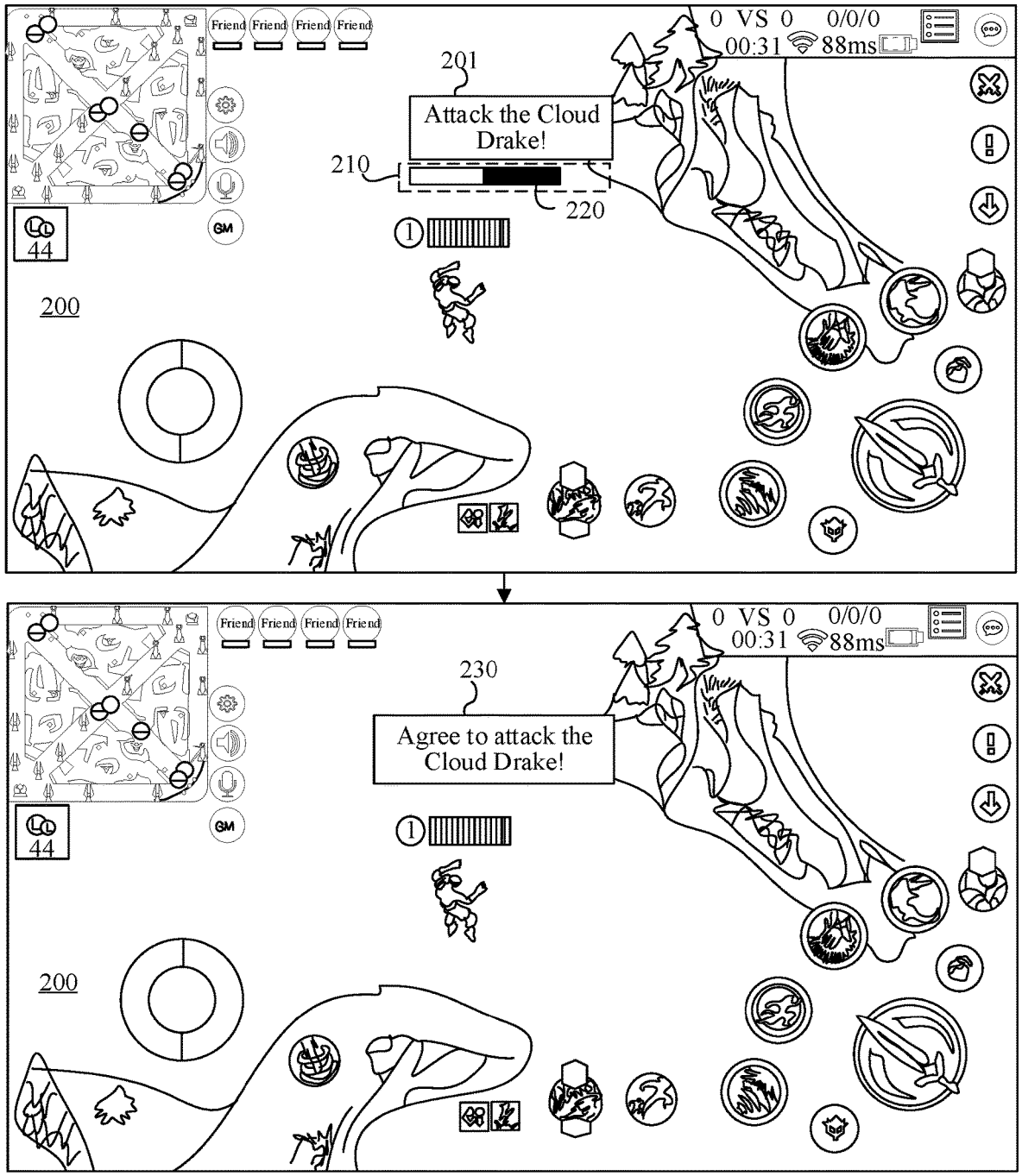
FIG. 2 is a schematic diagram of a method for displaying a voting result according to the present disclosure.

The present disclosure provides a method for displaying a voting result. Referring to FIG. 2, in the virtual game screen 200, a support status of a virtual object in the current camp for the action plan 201 is reflected in a vote counting area 210 in the form of a sub-area 220 according to a voting signal, and when content in the vote counting area 210 meets a result display condition, a voting result 230 corresponding to the action plan is displayed.

Figure 3:
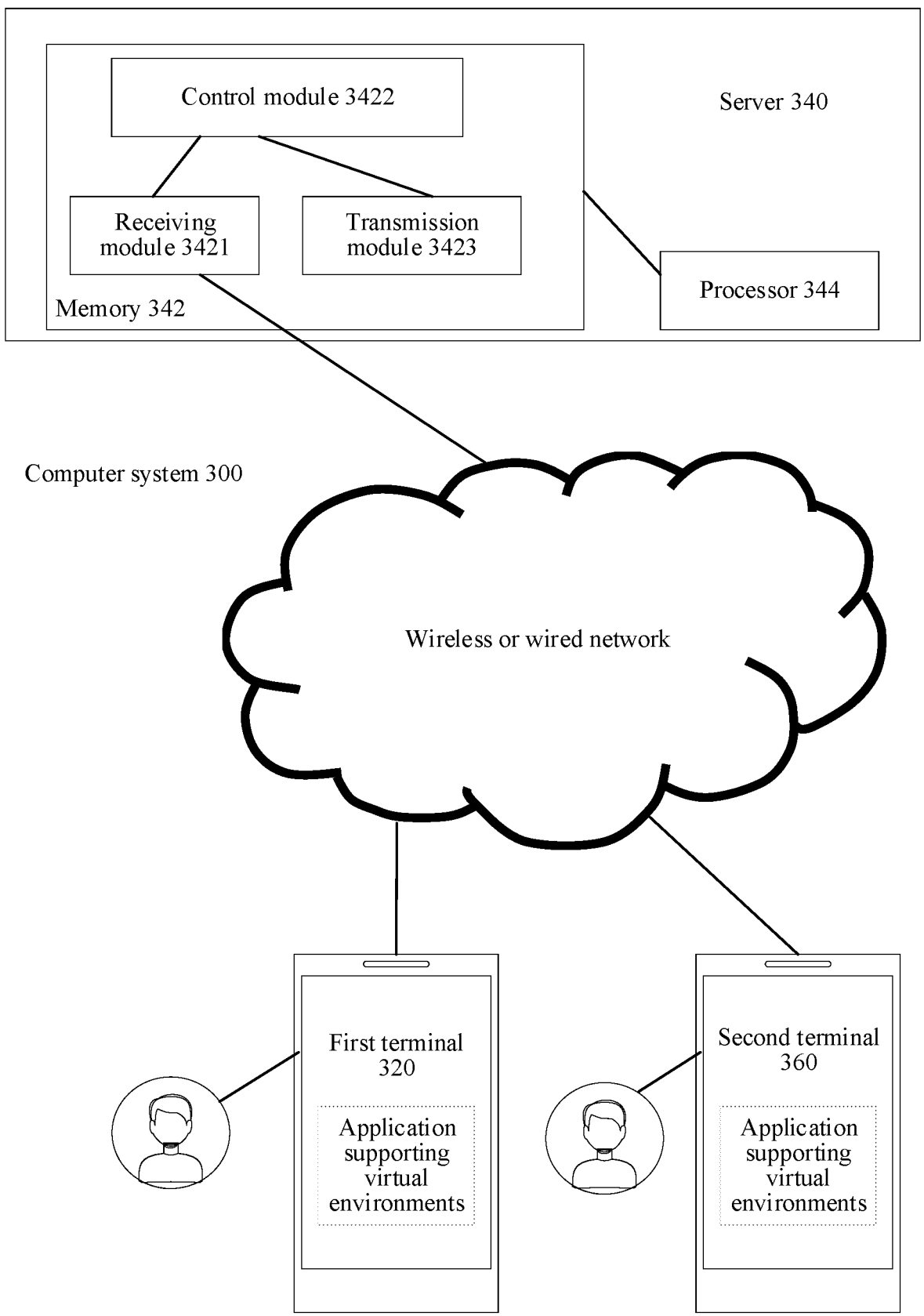
FIG. 3 is a structural block diagram of a computer system according to an exemplary embodiment of the present disclosure.

FIG. 3 is a structural block diagram of a computer system according to an exemplary embodiment of the present disclosure. The computer system 300 includes a first terminal 320, a server 340, and a second terminal 360.

An application supporting a virtual environment is installed and run on the first terminal 320. The application may be any one of a virtual reality application, a three-dimensional map program, a military simulation program, an FPS game, an MOBA game, a multiplayer shooting survival game, and a battle royale shooting game. The first terminal 320 is a terminal used by the first user, and the first user uses the first terminal 320 to control a first master virtual character located in the virtual environment to perform activities, including but not limited to: at least one of adjusting body posture, walking, running, jumping, releasing skills, picking-up, attacking, or dodging attacks from other virtual characters.

The first terminal 320 is connected to the server 340 by a wireless network or a wired network.

The server 340 includes a processor 344 and a memory 342, and the memory 342 further includes a receiving module 3421, a control module 3422 and a transmission module 3423, and the receiving module 3421 is used to receive a request sent by a client, such as a teaming request; The control module 3422 is configured to control the rendering of the virtual game screen; The transmission module 3423 is configured to send a message notification to the client, such as a team success notification. The server 340 is configured to provide a backend service for an application supporting a 3D virtual environment. In some embodiments, the server 340 is responsible for primary computing work, and the first terminal 320 and the second terminal 360 are responsible for secondary computing work; or the server 340 is responsible for secondary computing work, and the first terminal 320 and the second terminal 360 are responsible for primary computing work; or the server 340, the first terminal 320 and the second terminal 360 perform collaborative computing by using a distributed computing architecture among each other.

The second terminal 360 is connected to the server 340 by using a wireless network or a wired network.

An application supporting a virtual environment is installed and run on the second terminal 360. The application may be any one of a virtual reality application, a three-dimensional map program, a military simulation program, an FPS game, a MOBA game, a multiplayer shooting survival game, and a battle royale shooting game. The second terminal 360 is a terminal used by the second user, and the second user uses the second terminal 360 to control a second master virtual character located in the virtual environment to perform activities, including but not limited to: at least one of adjusting body posture, walking, running, jumping, releasing skills, picking-up, attacking, or dodging attacks from other master virtual characters. For example, the second master virtual character is a second virtual person, for example, a simulated person character or a cartoon person character.

In some embodiments, the first virtual person character and the second virtual person character are located in the same virtual environment. In some embodiments, the first virtual person character and the second virtual person character may belong to the same team or the same organization, have a friend relationship, or have a temporary communication permission.

In some embodiments, the applications installed on the first terminal 320 and the second terminal 360 are the same, or the applications installed on the two terminals are the same type of applications in different control system platforms. The first terminal 320 may generally refer to one of a plurality of terminals, and the second terminal 360 may generally refer to one of a plurality of terminals. In this embodiment, only the first terminal 320 and the second terminal 360 are used as an example for description. The first terminal 320 and the second terminal 360 are of the same or different device types. The device type includes at least one of a smartphone, a tablet computer, an e-book reader, a Moving Picture Experts Group Audio Layer III (MP3) player, a Moving Picture Experts Group Audio Layer IV (MP4) player, a laptop, and a desktop computer. The following embodiment is described by using an example in which the terminal includes a smartphone.

A person skilled in the art may learn that there may be more or fewer terminals. For example, there may be only one terminal, or there may be dozens of or hundreds of terminals or more. The number and the device type of the terminal are not limited in the embodiments of the present disclosure.

The server 340 may be implemented as a physical server or as a cloud server in a cloud. The cloud technology is a hosting technology that unifies a series of resources such as hardware, software, and networks in a wide area network or a local area network to implement computing, storage, processing, and sharing of data. The cloud technology is a collective name of a network technology, an information technology, an integration technology, a management platform technology, an application technology, and the like based on an application of a cloud computing business mode, and may form a resource pool, which is used as required, and is flexible and convenient. The cloud computing technology will become an important support. A background service of a technical network system requires a large amount of computing and storage resources, such as a video website, an image website, and more portal websites. As the Internet industry is highly developed and applied, each article may have its own identifier in the future and needs to be transmitted to a background system for logical processing. Data at different levels is separately processed, and data in various industries requires strong system support. This can only be achieved by cloud computing.

In some embodiments, the method provided by the embodiments of the present disclosure may be applicable to a cloud game scenario, where the calculation of data logic in the game process is implemented by a cloud server, and a terminal is responsible for displaying a game interface.

In some embodiments, the server 340 may also be implemented as a node in a blockchain system. A blockchain is a new application mode of computer technologies such as distributed data storage, point-to-point (P2P) transmission, consensus mechanisms, and encryption algorithms. The blockchain is essentially a decentralized database and is a string of data blocks generated through association by using a cryptographic method. Each data block includes information of a batch of network transactions, the information being used for verifying the validity of information of the data block (anti-counterfeiting) and generating a next data block. The blockchain may include an underlying blockchain platform, a platform product service layer, and an application service layer.

Figure 4:
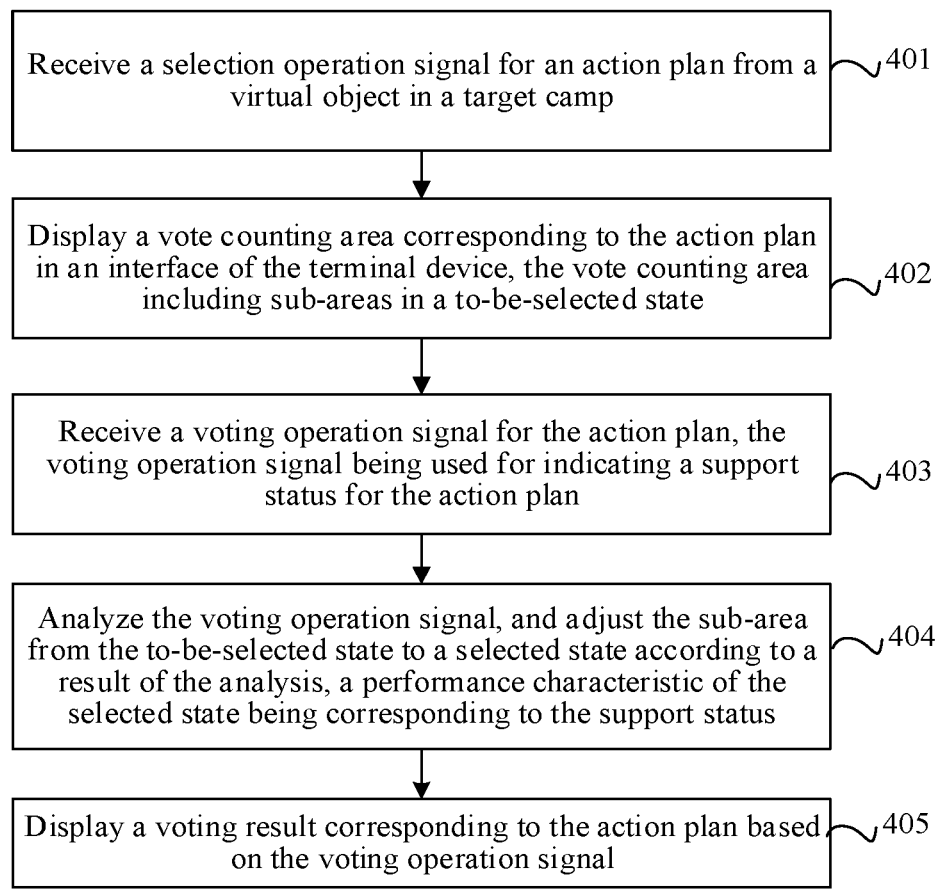
FIG. 4 is a flowchart of a method for displaying a voting result according to an exemplary embodiment of the present disclosure.

FIG. 4 is a flowchart of a method for displaying a voting result according to an exemplary embodiment of the present disclosure. The method is applicable to, for example, the first terminal 320 or the second terminal 360 in the computer system 300 shown in FIG. 3 or another terminal in the computer system 300.

Step 401. Receive a selection operation signal for an action plan from a virtual object in a target camp.

In one example, the action plan is a strategic action plan for the target camp in the virtual game. For example: the action plan is to attack a virtual building of an enemy camp; or, the action plan is to attack a hostile virtual object; or, the action plan is to defend a virtual building of the current camp; or, the action plan is to protect a virtual object of the current camp. The specific content of the action plan is not limited in embodiments of the present disclosure.

Figure 5:
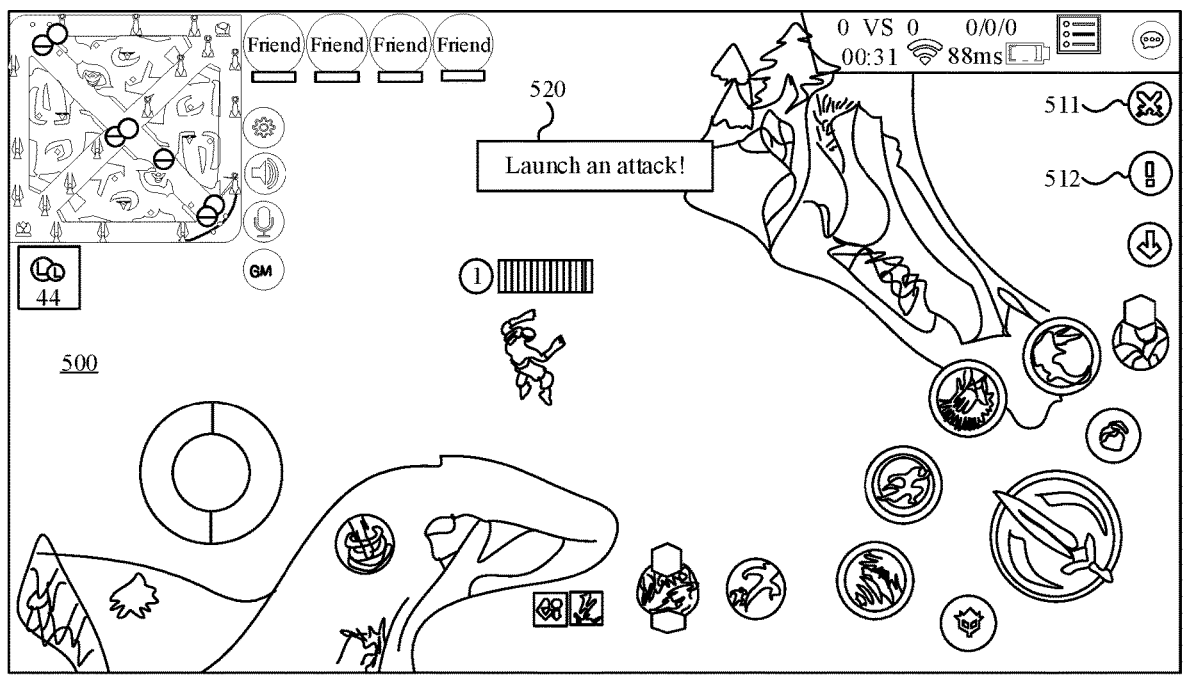
FIG. 5 is a schematic diagram showing action plan options according to an exemplary embodiment of the present disclosure.

In the embodiments of the present disclosure, all virtual objects (e.g., team members) in the target camp can select an action plan. Referring to FIG. 5, the virtual game screen 500 includes at least two action plan options, namely, an action plan option 511 and an action plan option 512, where the action plan option 511 is a plan option for launching an attack, and the action plan option 512 is a plan option for defending. Then, in response to a selection operation on the action plan option 511, a corresponding action plan 520 may be displayed in the virtual game screen, and the action plan 520 is displayed as text of "Launch an attack".

Step 402: Display a vote counting area corresponding to the action plan in an interface of the terminal device, the vote counting area including sub-areas in a to-be-selected state.

The vote counting area is a screen area displayed on the interface of the terminal device after the virtual object in the target camp makes a selection on the action plan. That is, after the virtual object in the target camp makes a selection on the action plan, because the virtual object controlled by the current terminal device is in the target camp, the vote counting area is displayed in the interface displayed by the current terminal device, where the vote counting area is overlay-displayed on top of the game screen, or the vote counting area is implemented as part of the game screen. In the embodiments of the present disclosure, the action plan is displayed on the virtual game screen in the form of text; or, the action plan is displayed on the virtual game screen in the form of an action path; or, the action plan is displayed on the virtual game screen in the form of an animation. The specific form of the action plan is not limited in the present disclosure. In this embodiment, the action plan is, for example, displayed on the virtual game screen in the form of text.

In the embodiments of the present disclosure, when the action plan is displayed in the virtual game screen, the vote counting area corresponding to the action plan is also displayed correspondingly. In some embodiments, the action plan remains in the virtual game screen continuously, or, the action plan is canceled after being displayed for a period of time.

In the embodiments of the present disclosure, the vote counting area includes sub-areas in the to-be-selected state, and each sub-area correspondingly displays an opinion of a virtual object in the camp on the action plan. When a virtual object does not express an opinion, the sub-area corresponding to the virtual object is embodied as an inactive to-be-selected state.

Step 403: Receive a voting operation signal for the action plan, the voting operation signal indicating a support status for the action plan In the embodiments of the present disclosure, in addition to the virtual object that initiates the action plan, the target camp also includes a virtual object that responds to the action plan, i.e., a virtual object that is not the initiator of the action plan needs to respond to the action plan.

In the embodiments of the present disclosure, corresponding to the action plan displayed on the virtual game screen, there are at least two voting options for expressing different opinions on the action plan. In some embodiments, the voting option corresponds to the support status of the action plan. For example, if the voting option includes a supporting option, the corresponding support status is supporting; if the voting option includes a non-supporting option, the corresponding support status is non-supporting; if the voting option includes an abstention option, the corresponding support status is a reserved state.

Figure 6:
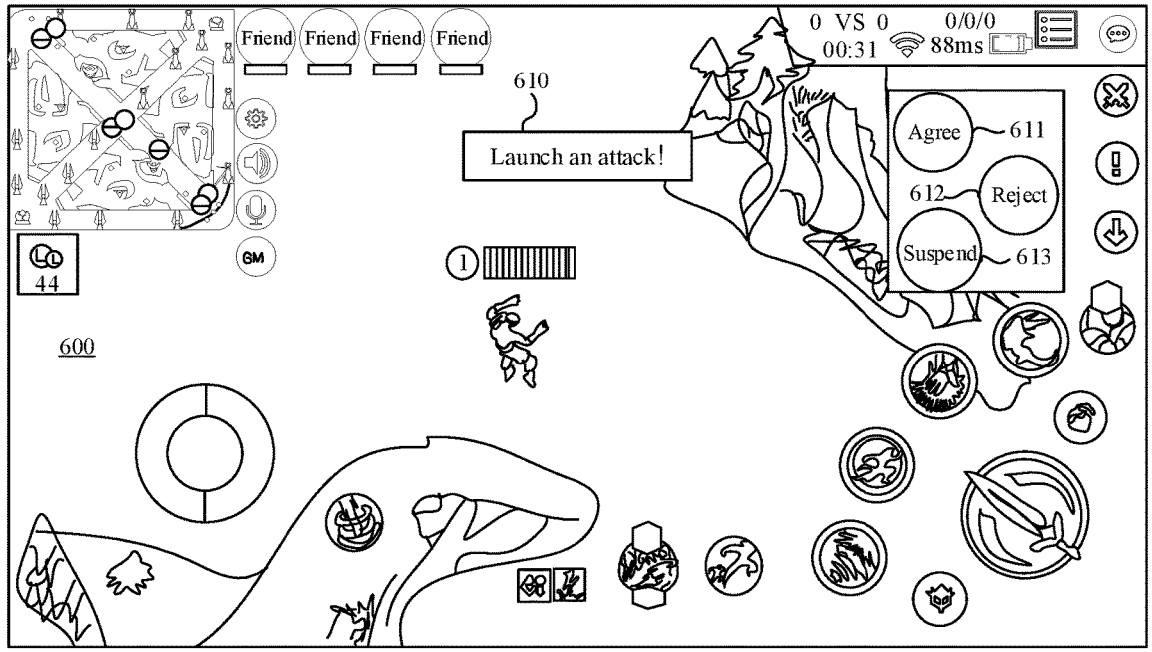
FIG. 6 is a schematic diagram of a method for showing an action plan and a voting option in a virtual game screen according to an exemplary embodiment of the present disclosure.

In an example, referring to FIG. 6, a virtual game screen 600 includes an action plan 610, the action plan 610 correspond to three different voting options, namely, voting option 611, voting option 612, and voting option 613. The voting option 611 is a voting option for agreeing to the action plan 610, the voting option 612 is an option for rejecting the action plan 610, and the voting option 613 is an option for suspending giving an opinion on the action plan 610.

In the embodiments of the present disclosure, the number of action plans is at least one, and when the number of action plans is at least two, the voting options may be implemented as options respectively set corresponding to the at least two action plans, or implemented as an option to be selected for either of the at least two action plans.

Figure 7:
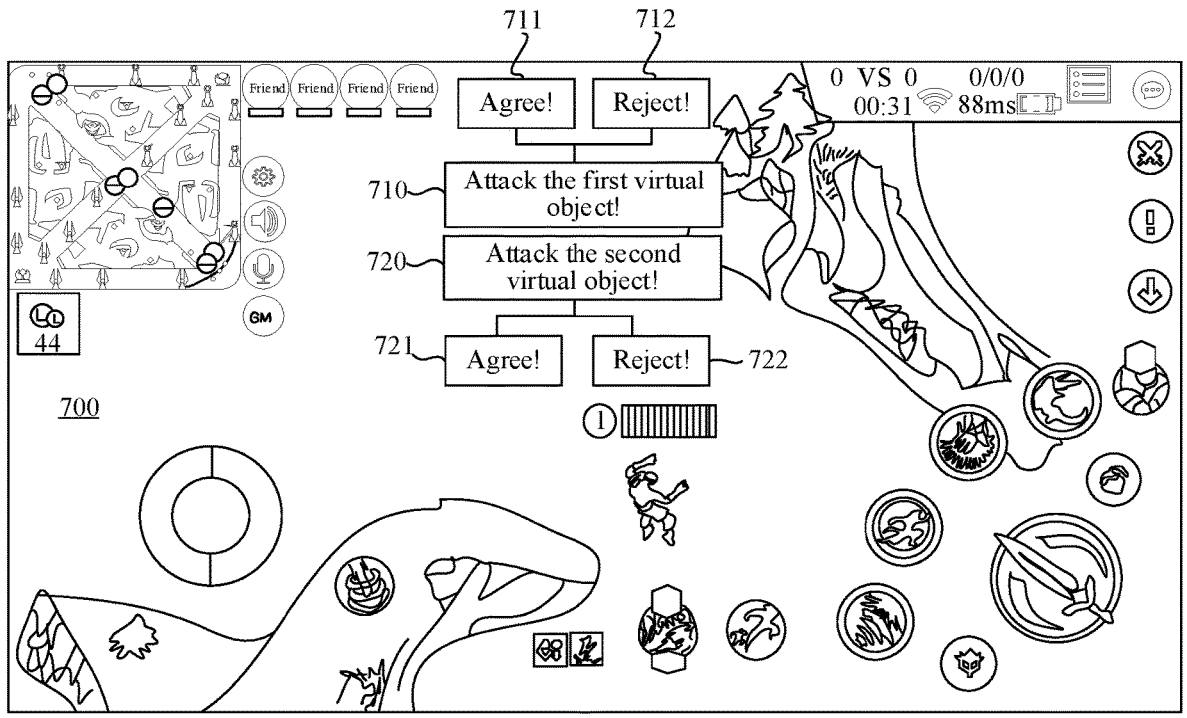
FIG. 7 is a schematic diagram of a method for showing multiple action plans and multiple voting options in a virtual game screen according to an exemplary embodiment of the present disclosure.

Referring to FIG. 7, a virtual game screen 700 includes an action plan 710 and an action plan 720. The action plan 710 instructs to attack a first virtual object, and the action plan 720 instructs to attack a second virtual object. Corresponding to the action plan 710, there are a voting option 711 and a voting option 712, where the voting option 711 is an option for agreeing to the action plan 710, and the voting option 712 is an option for rejecting the action plan 710. Corresponding to the action plan 720, there are a voting option 721 and a voting option 722, where the voting option 721 is an option for agreeing to the action plan 720, and the voting option 722 is an option for rejecting the action plan 720. That is to say, in this example, the action plan 710 and the action plan 720 are two independent action plans, and the user can give opinions on the action plan 710 and the action plan 720 respectively through the voting options.

Figure 8:
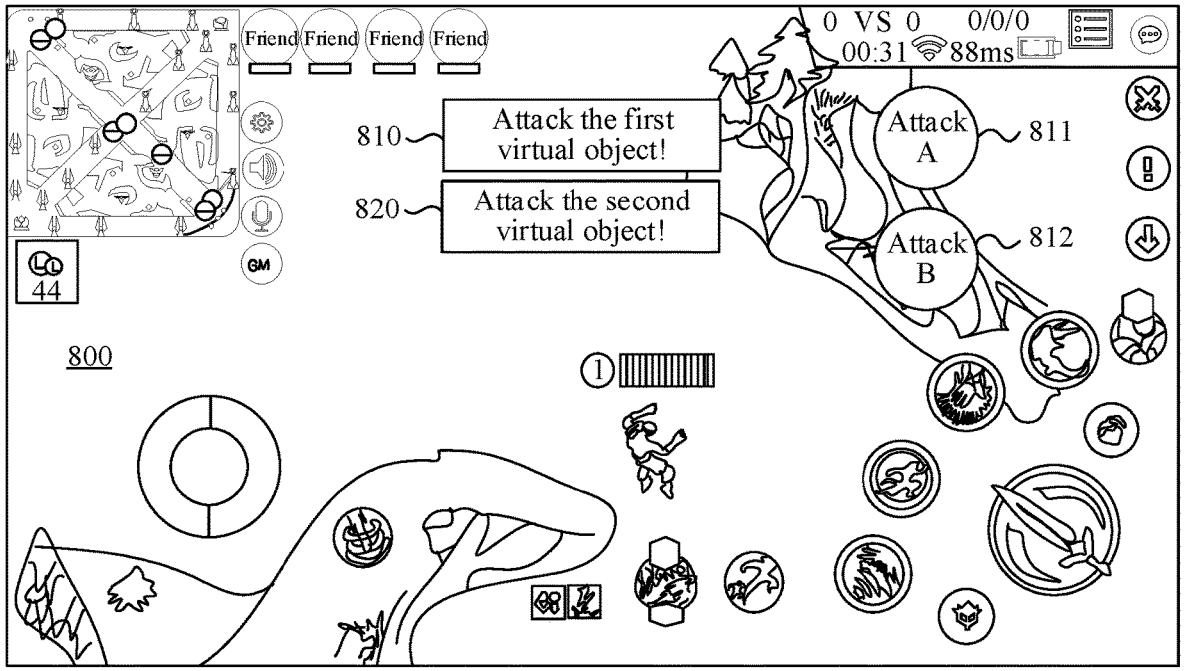
FIG. 8 is a schematic diagram of a method for showing multiple action plans and multiple voting options in a virtual game screen according to another exemplary embodiment of the present disclosure.

Referring to FIG. 8, a virtual game screen 800 includes an action plan 810 and an action plan 820. The action plan 810 instructs to attack a first virtual object, the action plan 820 instructs to attack a second virtual object, and the virtual environment further includes a voting option 811 and a voting option 812. The voting option 811 is an option for agreeing to the action plan 810, and the voting option 812 is an option for agreeing to the action plan 820. The user may select at least one action option from the action plan 810 and the action plan 820 by selecting the voting option 811 and/or the voting option 812.

Step 404. Analyze the voting operation signal, and adjust the sub-area from the to-be-selected state to a selected state according to a result of the analysis, a display characteristic of the selected state being corresponding to the support status. For example, one of the sub-areas is adjusted from the to-be-selected state to a selected state with a display characteristic corresponding to the support status according to the voting operation signal, where different support status corresponds to different display characteristics for the sub-areas.

In some embodiments, multiple voting operation signals may be received from multiple team members of the target camp, and the adjustment of the sub-areas can be performed one at a time. For example, a first voting operation signal and a second voting operation signal for the action plan are received. A first sub-area is adjusted from the to-be-selected state to the selected state according to the first voting operation signal at a first time point; and a second sub-area is adjusted from the to-be-selected state to the selected state according to the second voting operation signal at a second time point different from the first time point.

In some embodiments, the support status includes supporting the action plan or opposing the action plan; or, the support status further includes conditionally supporting the action plan. The specific content of the support status is not limited in the embodiments of the present disclosure.

In some embodiments, the vote counting area includes a number of sub-areas, the number being corresponding to the number of virtual objects in the target camp. In an example, the number of virtual objects in the target camp is 5, and the vote counting area includes 5 sub-areas. In another example, the number of virtual objects in the target camp is 10, the vote counting area includes 5 sub-areas, and every two virtual objects correspond to one sub-area.

In some embodiments, after receiving the voting operation signal, the support status corresponding to the voting operation signal is analyzed first, the result of the analysis is determined according to the support status corresponding to the voting operation signal, and the sub-area is adjusted to the selected state according to the result of the analysis. In some embodiments, when one sub-area corresponds to one virtual object, after the virtual object completes the voting, the sub-area corresponding to the virtual object is directly adjusted to the selected state according to the support status of the virtual object for the action plan; when one sub-area corresponds to at least two virtual objects, an analysis result is obtained according to the voting results respectively corresponding to the at least two virtual objects, and the sub-area is adjusted to the selected state according to the analysis result. For example, when all the at least two virtual objects choose to support the action plan, the corresponding sub-area is adjusted to the selected state corresponding to "supporting".

In the embodiments of the present disclosure, if the action plan remains being displayed, the vote counting area for the action plan is located on a peripheral side of the action plan. For example, the vote counting area is located below the action plan. In some embodiments, after each virtual object in the target camp completes voting, the sub-area in the vote counting area is adjusted from the to-be-selected state to the selected state corresponding to the support status. In the embodiments of the present disclosure, when a sub-area is in the to-be-selected state, it is displayed as a colorless color block; when a sub-area is in the selected state and indicates supporting the action plan, it is displayed as a green color block; when an area is in the selected state and indicates not supporting the action plan, it is displayed as a red color block.

In one embodiment, the vote counting area includes a selection progress bar, and the sub-areas are progress blocks in the selection progress bar. In some embodiments, the voting operation signal is analyzed, and the sub-area in the selection progress bar is adjusted from a candidate color (e.g., transparent and colorless) to a selected color according to a result of the analysis, the candidate color being corresponding to the to-be-selected state, and the selected color being corresponding to the support status.

In some embodiments, the voting operation signal also corresponds to a voting virtual object. In this case, the sub-area corresponding to the voting virtual object in the selection progress bar is adjusted from the candidate color to the selected color, a correspondence between the sub-areas in the selection progress bar and virtual objects is preset. For example, the target camp includes a virtual object 1, a virtual object 2, and a virtual object 3. The virtual object 1 corresponds to the first sub-area in the selection progress bar, the virtual object 2 corresponds to the second sub-area in the selection progress bar, and the virtual object 3 corresponds to the third sub-area in the selection progress bar. When the virtual object 3 generates a voting operation signal, the third sub-area is adjusted from the candidate color to the selected color.

Alternatively, the sub-area which is the first sub-area displayed as the candidate color in the progress bar is adjusted to the selected color according to the result of the analysis.

Figure 9:
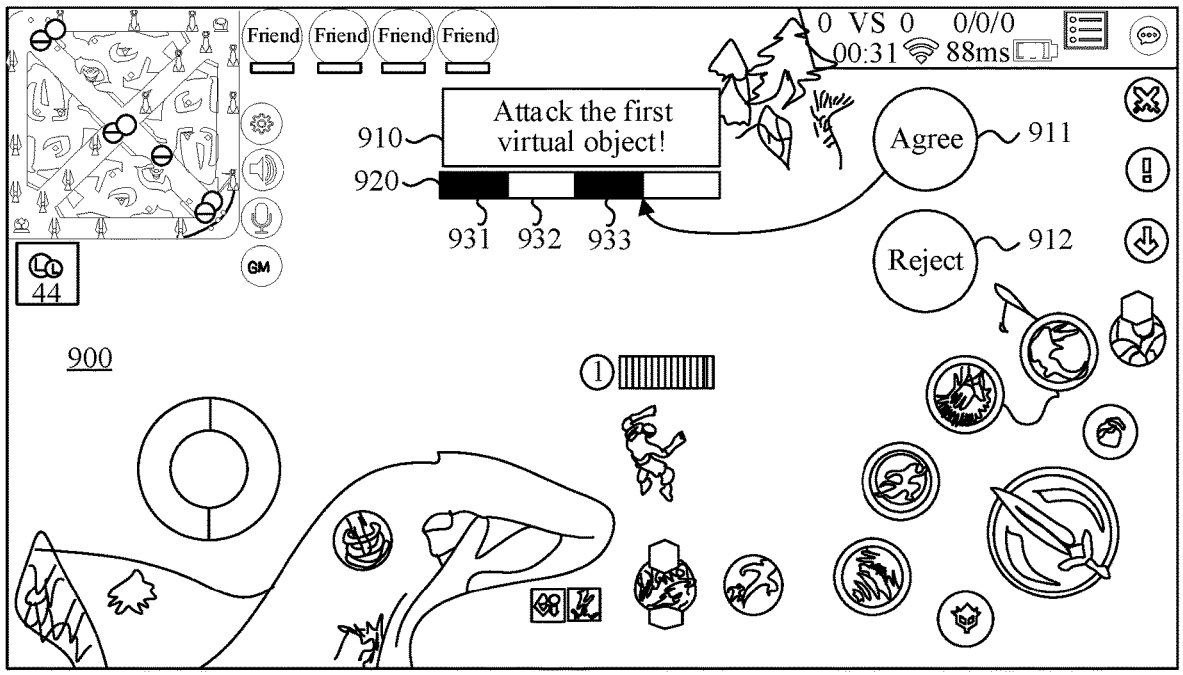
FIG. 9 is a schematic diagram showing a change of a voting option corresponding to a selected state of a sub-area according to an exemplary embodiment of the present disclosure.

In the embodiments of the present disclosure, when the virtual game screen further includes voting options, the types of voting sub-results correspond one-to-one to the types of voting options. Referring to FIG. 9, in a virtual game screen 900, an action plan 910 instructing to attack a first virtual object corresponds to a voting option 911 for agreeing to the action plan 910 and a voting option 912 for opposing the action plan 910. A vote counting area 920 below the action plan 910 includes a sub-area 931, a sub-area 932, and a sub-area 933. The sub-area 931 corresponds to a selected state of supporting the action plan 910, and the sub-area 932 corresponds to a selected state of opposing the action plan 910. Then, in response to receiving a selection operation on the voting option 911, the sub-area 933 is determined to be in the same selected state as the sub-area 931.

Step 405. Display a voting result corresponding to the action plan based on the voting operation signal.

In some embodiments, the voting result is displayed in response to a vote counting result in the vote counting area meeting a result display condition.

In some embodiments, the result display condition includes at least one of a time condition, a number condition, and a voting signal condition (e.g., sub-area condition), where the time condition indicates that a voting time reaches a time threshold, the number condition indicates that a total number of votes reaches a number threshold, and the voting signal condition indicates that a number of voting signals in the same support status satisfying a number threshold (e.g., this can be displayed as a number of sub-areas in the same state reaching the number threshold). The specific content of the voting result display condition is not limited in the embodiments of the present disclosure.

In the embodiments of the present disclosure, when the voting result is displayed, the action plan and the sub-areas are no longer displayed.

In some embodiments, the voting result corresponds to a display characteristic of the selected state of the sub-area. In an example, the display characteristic of the sub-area includes a display characteristic of agreeing to the action plan and a display characteristic of rejecting the action plan, and correspondingly, the voting result includes a supporting result or a rejection result.

In one example, when the number of votes received within a preset period of time is less than a number threshold, the voting result is a suspending result. The suspending result indicates that the action plan is not to be executed for the time being and the corresponding voting option will be displayed again after a preset time range.

In the embodiments of the present disclosure, after the voting result is displayed, the user can control the virtual object to perform related operations according to the content of the voting result.

To sum up, according to the method provided by the embodiments of the present disclosure, the vote counting area is displayed corresponding to the action plan, and when voting signals are received, voting options selected by target virtual objects are displayed in the sub-areas based on the voting signals, and a voting result is further displayed. The sub-areas in the vote counting area correspond to the virtual objects in the target camp. By displaying support statuses of the virtual objects for the action plan in the sub-areas and finally displaying a voting result for the action plan according to a content in the vote counting area, the efficiency of displaying the final result of voting is improved, thereby improving the players' sense of experience in a virtual game.

Figure 10:
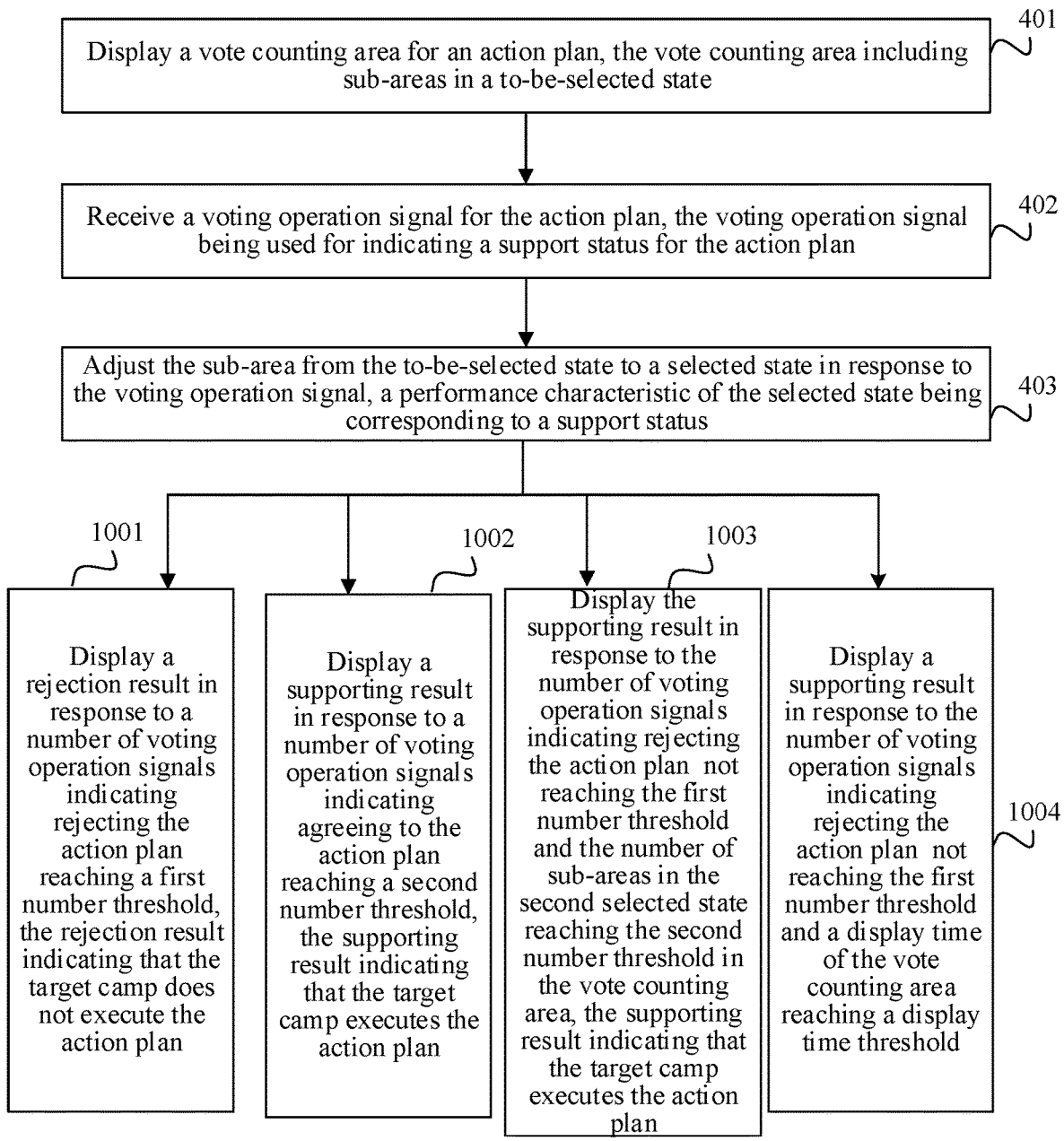
FIG. 10 is a flowchart of a method for displaying a voting result according to another exemplary embodiment of the present disclosure.

In some embodiments, the final voting results include a supporting result or a rejection result. FIG. 10 is a flowchart of a method for displaying a voting result according to an exemplary embodiment of the present disclosure. Step 405 shown in FIG. 4 may be replaced with the following steps 1001 to 1003. Step 405 includes:

Step 1001. Display a rejection result in response to a number of voting operation signals indicating rejecting the action plan reaching a first number threshold (which leads to and can be reflected as a number of sub-areas in the first selected state in the vote counting area reaching the first number threshold), the rejection result indicating that the target camp does not execute the action plan.

In an embodiment of the present disclosure, the selected state in the sub-area includes a first selected state or a second selected state, wherein the first selected state indicates rejecting the action plan, and the second selected state indicates agreeing to the action plan.

In an embodiment of the present disclosure, a first number threshold is set corresponding to voting operation signals indicating rejecting the action plan. The first number threshold is also a number threshold for sub-areas in the first selected state. In some embodiments, the first number threshold is set based on the number of virtual objects in the target camp. In one example, the first number threshold is an integer rounded up from 50% of the number of virtual objects in the target camp. When the number of virtual objects in the target camp is 5, the first number threshold is 3.

Figure 11:
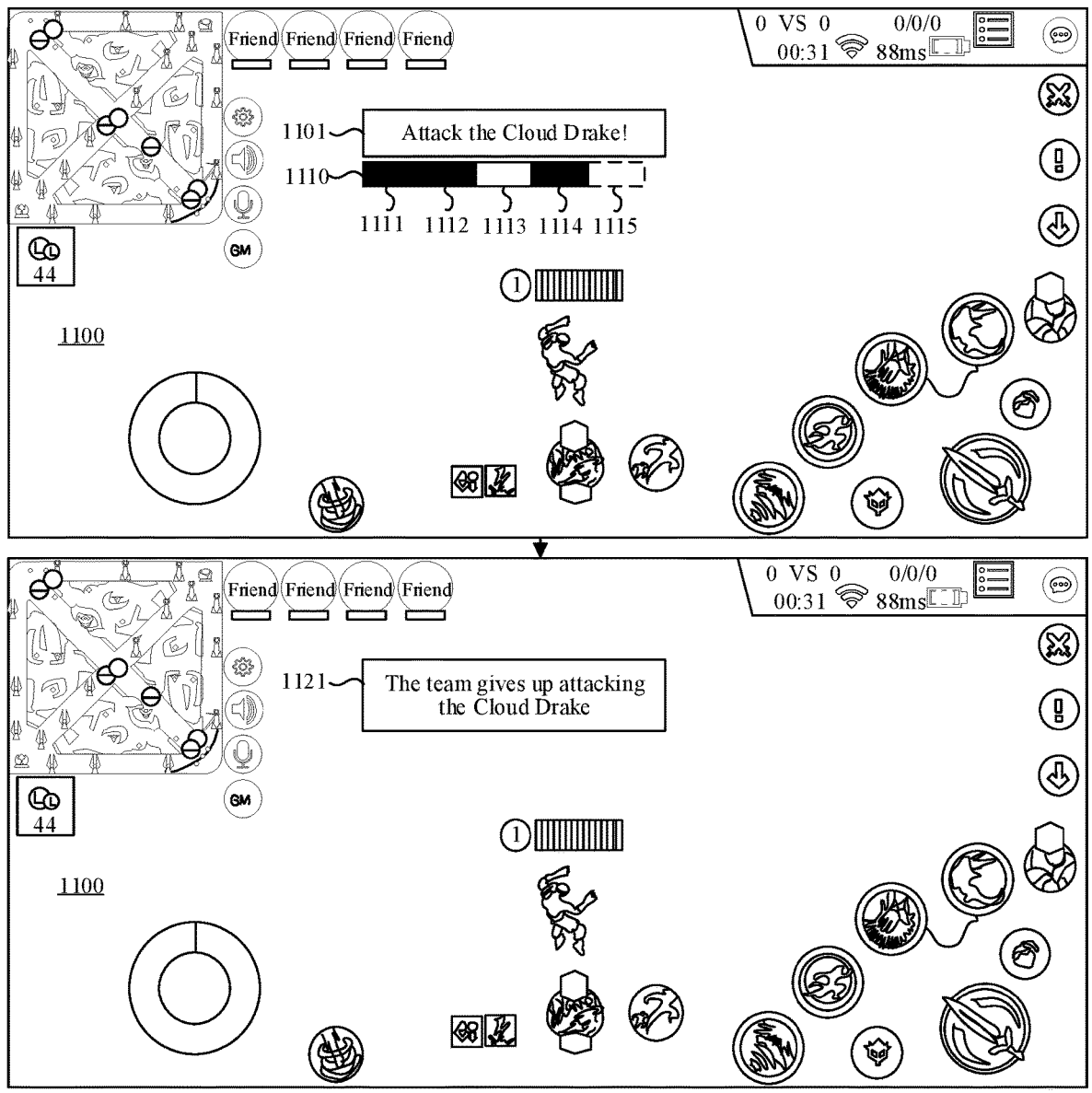
FIG. 11 is a schematic diagram showing a process of generating a voting result according to an exemplary embodiment of the present disclosure.

Referring to FIG. 11, in a virtual game screen 1100, there are 5 virtual objects belonging to the target camp, and correspondingly the first number threshold is set to 3. Corresponding to an action plan 1101, a vote counting area 1110 includes a sub-area 1111, a sub-area 1112, a sub-area 1113, a sub-area 1114, and a sub-area 1115. The sub-area 1115 is in the to-be-selected state, so the border of the sub-area 1115 is not displayed. In addition, in the vote counting area 1110, the sub-areas in the first selected state are displayed in black, and the sub-areas in the second selected state are displayed in white. Then, as shown in FIG. 11, in the vote counting area 1110, the sub-area 1111, the sub-area 1112, and the sub-area 1114 are all in the first selected state, i.e., displayed in black, and the sub-area 1113 is in the second selected state, i.e., displayed in white. In this case, because the number of sub-areas in the first selected state reaches the number threshold, a rejection result 1121 is displayed corresponding to the action plan 1101 in the virtual game screen, where the rejection result 1121 indicates that the camp does not execute the action plan. Because the action plan instructs to attack a virtual object named "Cloud Drake", a content of the rejection result 1121 is "The team gives up attacking the Cloud Drake".

Step 1002. Display a supporting result in response to a number of voting operation signals indicating agreeing to the action plan reaching a second number threshold, the supporting result indicating that team members of the target camp agree on executing the action plan. In this case, a number of sub-areas in the second selected state in the vote counting area reaches the second number threshold.

In an embodiment of the present disclosure, a second number threshold is further set corresponding to the number of voting sub-results, and the second number threshold is a number threshold for sub-results indicating agreeing to the action plan. In some embodiments, the second number threshold is set based on the number of virtual objects in the camp, or is set based on the number of virtual objects in the camp and the first number threshold. In one example, the second number threshold is an integer rounded up from 50% of the number of virtual objects in the camp. When the number of virtual objects in the camp is 5, the second number threshold is 3. In another example, the sum of the second number threshold and the first number threshold equals the number of virtual objects in the camp. When the number of virtual objects in the camp is 5 and the first number threshold is 3, the second number threshold is 5−3=2. In the present disclosure, an example where the sum of the second number threshold and the first number threshold equals the number of virtual objects in the camp is described.

Step 1003. Display the supporting result in response to a number of voting operation signals indicating rejecting the action plan not reaching the first number threshold and a number of voting operation signals indicating agreeing to the action plan reaching the second number threshold, the supporting result indicating that team members of the target camp agree on executing the action plan. In this case, the number of sub-areas in the first selected state does not reach the first number threshold and the number of sub-areas in the second selected state reaches the second number threshold in the vote counting area.

Figure 12:
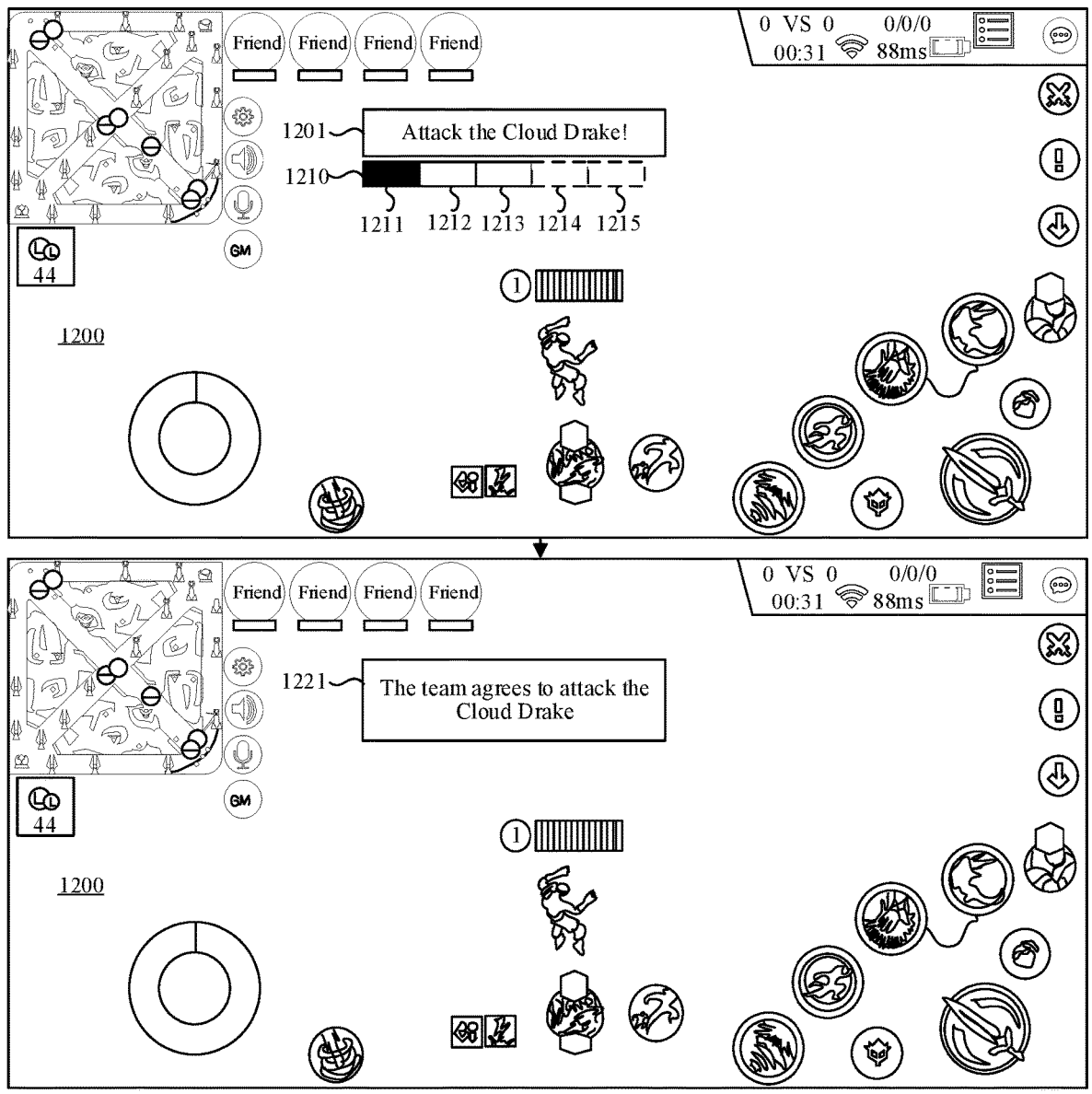
FIG. 12 is a schematic diagram showing a process of generating a voting result according to another exemplary embodiment of the present disclosure.

Referring to FIG. 12, in a virtual game screen 1200, there are 5 virtual objects belonging to a first camp; correspondingly, the set first number threshold is set to 3, and the second number threshold is set to 5−3=2. Corresponding to an action plan 1201, a vote counting area 1210 includes a sub-area 1211, a sub-area 1212, a sub-area 1213, a sub-area 1214 and a sub-area 1215. The sub-area 1214 and the sub-area 1215 are in the to-be-selected state, so the borders of the sub-area 1214 and the sub-area 1215 are not displayed. In addition, in the vote counting area 1210, the sub-areas in the first selected state are displayed in black, and the sub-areas in the second selected state are displayed in white. In FIG. 12, the sub-area 1211 is in the first selected state, and the sub-area 1212 and the sub-area 1213 are in the second selected state. That is to say, the number of sub-areas in the second selected state reaches the second number threshold, and the number of sub-areas in the first selected state does not reach the first number threshold. Correspondingly, the action plan 1201 displays a supporting result 1221, where the supporting result 1221 instructs the camp to execute the action plan. Since the action plan instructs to attack a virtual object named "Cloud Drake", a content of supporting result 1221 is "The team agrees to attack the Cloud Drake".

Step 1004. Display a supporting result in response to a number of voting operation signals indicating rejecting the action plan not reaching the first number threshold and a display time of the vote counting area reaching a display time threshold. In this case, the number of sub-areas in the first selected state does not reach the first number threshold.

It can be understood that a number of sub-areas in the first or second selected state is determined by and reflects the number of voting operation signals indicating rejecting or agreeing to the action plan. Although in some description of the present disclosure, certain voting result is written as being determined/displayed in response to the number of sub-areas in the first or second selected state satisfying certain condition, the voting result is in fact determined according to the voting operation signals that cause state changes of the sub-areas.

In the embodiments of the present disclosure, in order to ensure the timeliness of the action plan, a time threshold is set for the action plan. When the display time of the action plan reaches the time threshold, the voting result may be displayed directly even if neither of the number of voting operation signals indicating rejecting the action plan and the number of voting operation signals indicating agreeing to the action plan reaches the respective number threshold. Based on user habits, when users observe that the action plan displayed in the virtual game screen conforms to their own thoughts, they usually do not make any response, i.e., it may be determined by default that a user agrees to the action plan when no response is received from the user. When users observe that the action plan displayed in the virtual game screen does not conform to their own ideas, they usually vote to reject the action plan. Therefore, within the time threshold, the voting result is displayed by determining number of voting operation signals indicating rejecting the action plan (which can be reflected as the result display sub-areas the first selected state in the vote counting area).

Figure 13:
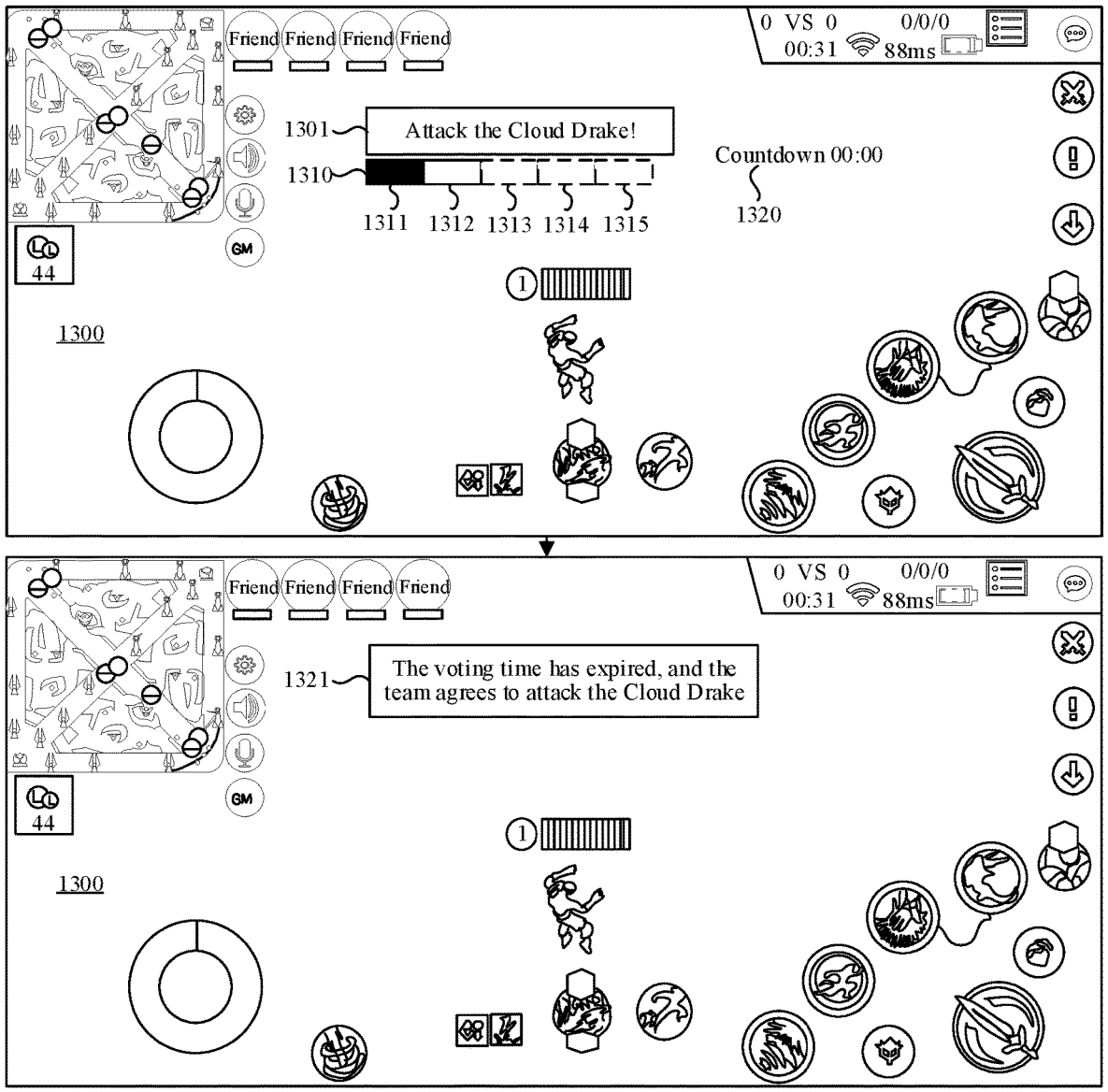
FIG. 13 is a schematic diagram showing a process of generating a voting result according to another exemplary embodiment of the present disclosure.

Referring to FIG. 13, in a virtual game screen 1300, there are 5 virtual objects belonging to a first camp, and correspondingly the first number threshold is set to 3. Corresponding to an action plan 1301, a vote counting area 1310 includes a sub-area 1311, a sub-area 1312, a sub-area 1313, a sub-area 1314 and a sub-area 1315. The sub-area 1313, the sub-area 1314, and the sub-area 1315 are in the to-be-selected state, so the borders of the sub-area 1313, the sub-area 1314, and the sub-area 1315 are not displayed. In addition, in the vote counting area 1310, the sub-areas in the first selected state are displayed in black, and the sub-areas in the second selected state are displayed in white. In FIG. 13, the sub-area 1311 and the sub-area 1312 are both in the first selected state in the virtual game screen. However, because a voting time 1320 corresponding to the vote counting area 1310 shows that the voting time has expired, a supporting result 1321 is displayed. Since the action plan instructs to attack a virtual object named "Cloud Drake" and the displaying of the supporting result 1321 is triggered because the number of sub-areas in the first selected state does not reach 3 within the preset time period, a content of supporting result 1321 is "The voting time has expired, and the team agrees to attack the Cloud Drake".

To sum up, according to the method provided by the embodiments of the present disclosure, the vote counting area is displayed corresponding to the action plan, and when voting signals are received, voting options selected by target virtual objects are displayed in the sub-areas based on the voting signals, and a voting result is further displayed. The sub-areas in the vote counting area correspond to the virtual objects in the target camp. By displaying support statuses of the virtual objects for the action plan in the sub-areas and finally displaying a voting result for the action plan according to a content in the vote counting area, the efficiency of displaying the final result of voting is improved, thereby improving the players' sense of experience in a virtual game.

In the method provided by the embodiments of the present disclosure, a final result of agreeing to the plan and a final result of rejecting the plan are set corresponding to the action plan, and the final voting result is displayed when the numbers of sub-areas in different selected states satisfy the result display condition, which makes the presentation of the final voting result clearer, thereby further improving the efficiency of displaying the final voting result.

In the method provided by the embodiments of the present disclosure, by setting a time threshold for the action plan and directly determining a voting result when the time threshold is reached, the timeliness of the action plan is ensured, thereby further improving the efficiency of displaying the final voting result.

Figure 14:
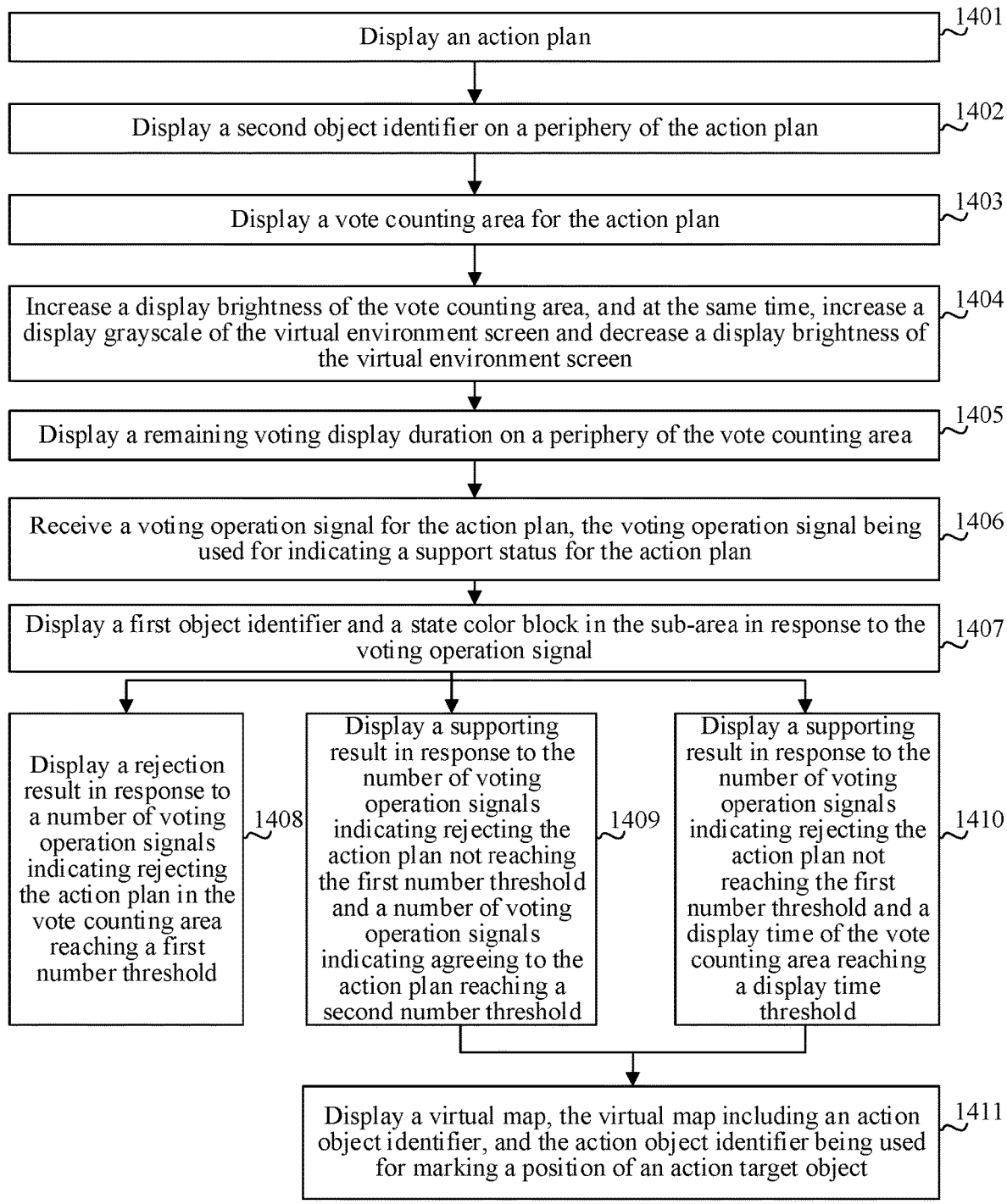
FIG. 14 is a flowchart of a method for displaying a voting result according to another exemplary embodiment of the present disclosure.

In some embodiments, the action plan corresponds to a virtual object that initiates the action plan. When displaying the action plan, the virtual object that initiates the action plan needs to be displayed synchronously. FIG. 14 is a flowchart of a method for displaying a voting result according to an exemplary embodiment of the present disclosure. The method is applicable to, for example, a terminal. The method includes:

Step 1401. Display an action plan.

In the embodiments of the present disclosure, the action plan is displayed on the virtual game screen in the form of text; or, the action plan is displayed on the virtual game screen in the form of an action path.

Step 1402. Display a second object identifier on a peripheral side of the action plan.

Figure 15:
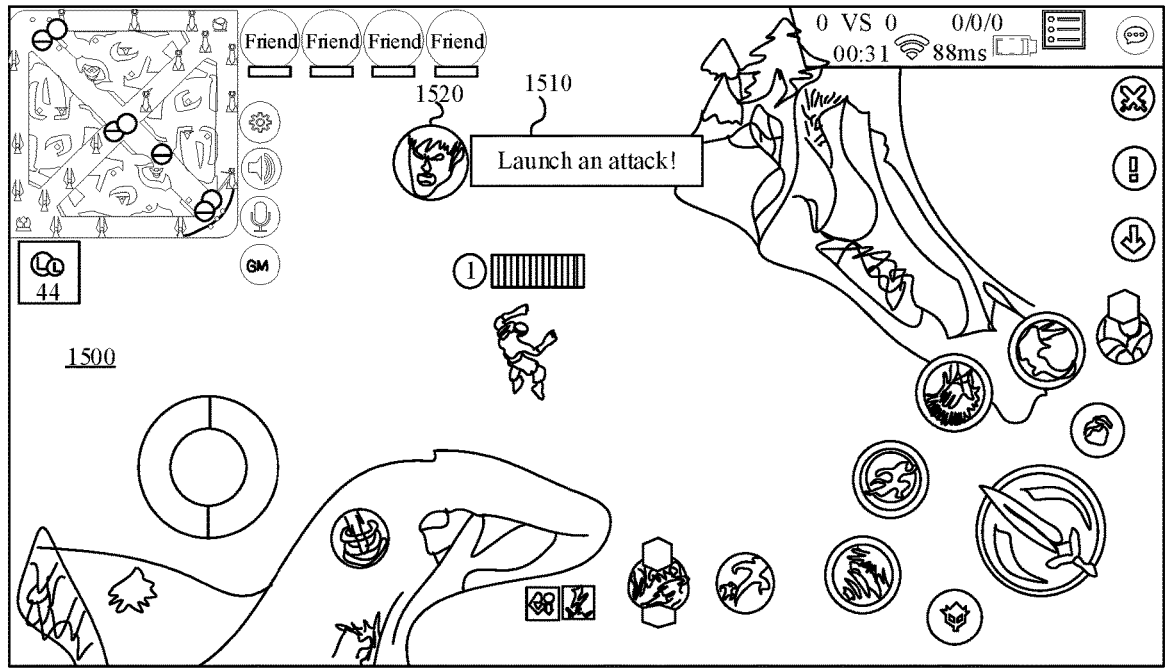
FIG. 15 is a schematic diagram of a virtual game screen containing an initiating object identifier according to an exemplary embodiment of the present disclosure.

In the embodiments of the present disclosure, to enable the virtual objects in the same camp to know the initiator of the action plan, the virtual object that initiates the action plan is displayed on the peripheral side of the action plan. Referring to FIG. 15, in a virtual game screen 1500, a second object identifier 1520 is displayed on a left side of an action plan 1510, and the plan initiating object identifier is used for indicating the plan initiating object. In some embodiments, the second object identifier 1520 is an avatar corresponding to a virtual character profile of the plan initiating object.

Step 1403. Displaying a vote counting area for the action plan.

In this embodiment of the present disclosure, the vote counting area may be displayed synchronously with the action plan, or the vote counting area may be displayed after displaying the action plan, or the vote counting area may be displayed after a period of time after displaying the action plan, and displayed together with the action plan.

Step 1404. Increase a display brightness of the vote counting area, and at the same time, increase a display grayscale of the virtual environment screen and decrease a display brightness of the virtual environment screen.

In the embodiments of the present disclosure, to prompt the user to vote, after the vote counting area is displayed, the vote counting area is highlighted, and at the same time, the virtual environment screen except the vote counting area is grayscaled, and the display brightness of the virtual environment screen except the vote counting area is decreased, so as to enhance the display of the vote counting area.

Step 1405: Display a remaining voting time on a peripheral side of the voting process display area.

Figure 16:
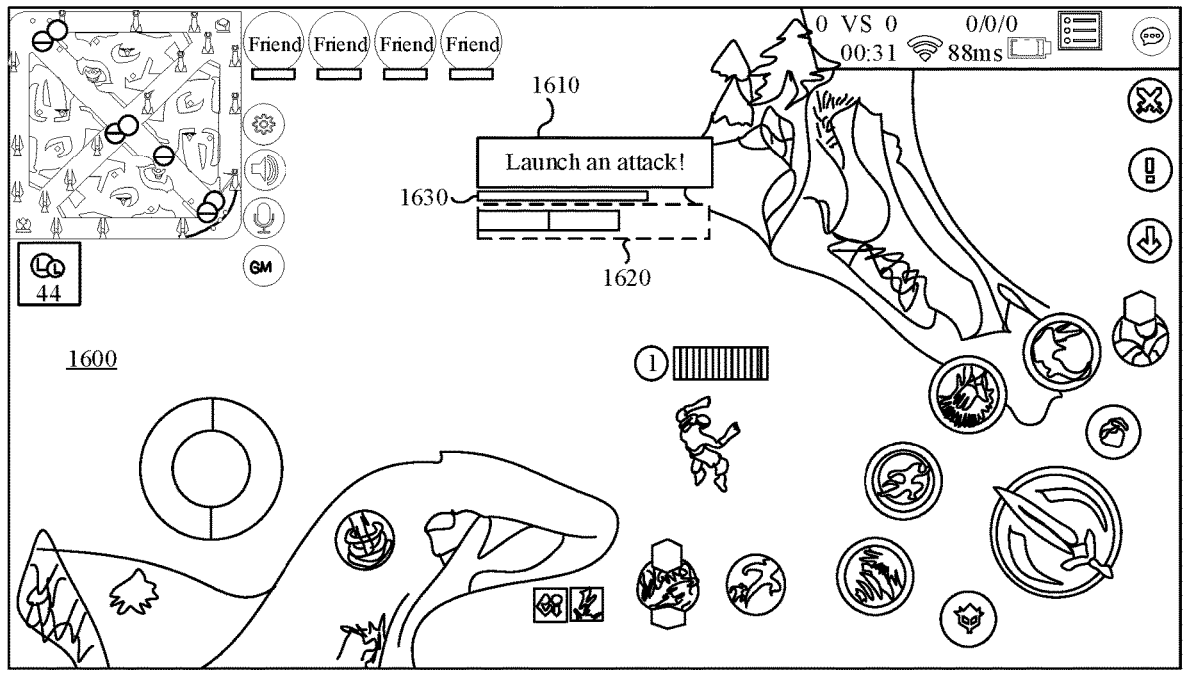
FIG. 16 is a schematic diagram of a virtual game screen containing a progress bar according to an exemplary embodiment of the present disclosure.

In the embodiments of the present disclosure, in order to ensure the timeliness of the action plan, the voting process of the virtual object needs to be completed within a limited time, so a time threshold is set in the terminal. In some embodiments, the remaining voting time is represented in the form of countdown numbers, or the remaining voting time is represented in the form of a gradually decreasing progress bar. Referring to FIG. 16, in a virtual game screen 1600, an action plan 1610 and a vote counting area 1620 below the action plan 1610 are displayed. Between the action plan 1610 and the vote counting area 1620, there is a progress bar 1630 indicating the remaining voting time. The progress bar is used for indicating a time remaining for the virtual objects in the camp to vote. When the length of the progress bar 1630 decreases to 0, it indicates that the voting on the corresponding action plan ends, that is, the voting result is determined.

Step 1406: Receive a voting operation signal for the action plan, the voting operation signal indicating a support status for the action plan Step 1407. Display a first object identifier and a state color block in the sub-area in response to the voting operation signal.

In the embodiments of the present disclosure, state color blocks in different colors are used to indicate sub-areas in different selected states. In some embodiments, the selected state includes a first selected state that indicates opposing the action plan and is represented by a red state color block, or the selected state includes a second selected state that indicates supporting the action plan and is represented by a green state color block.

In the embodiments of the present disclosure, the virtual objects of the target camp vote in a registered manner, so the sub-area not only includes the state color block indicating the selected state, but also includes a virtual object identifier. In the virtual game, the virtual object identifier is used for uniquely indicating a virtual object in the target camp.

Figure 17:
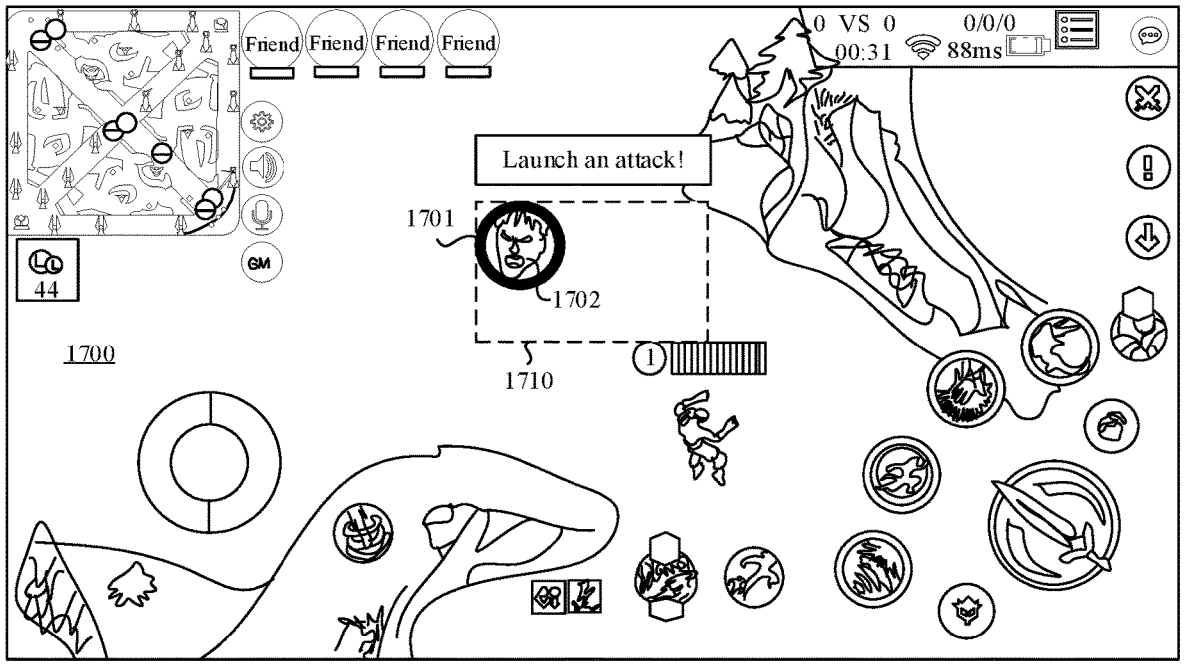
FIG. 17 is a schematic diagram of a virtual game screen corresponding to a non-anonymous voting according to an exemplary embodiment of the present disclosure.

In one example, the state color block is displayed as a circular color block and is displayed on a peripheral side of the virtual object identifier. Referring to FIG. 17, in a virtual game screen 1700, a vote counting area 1710 includes a black circular state color block 1701 and a virtual object identifier 1702 located in the black circular state color block 1701. The black circular state color block 1701 indicates that the sub-area corresponding to the black circular state color block 1701 is in the first selected state, i.e., the selected state of opposing the action plan.

Alternatively, the first object identifier is overlay-displayed on the state color block.

Step 1408. Display a rejection result in response to a number of voting operation signals indicating rejecting the action plan reaching a first number threshold. The number of voting operation signals indicating rejecting the action plan reaching the first number threshold can lead to and be reflected as a number of sub-areas in the first selected state reaching the first number threshold).

The first number threshold is a number threshold for sub-areas in the first selected state. In some embodiments, the first number threshold is proportional to the total number of virtual objects in the target camp. In one example, the first number threshold is an integer rounded up from 50% of the number of virtual objects in the camp.

Step 1409. Display the supporting result in response to the number voting operation signals indicating rejecting the action plan not reaching the first number threshold and the number of voting operation signals indicating agreeing to the action plan reaching the second number threshold. In this case, the number of sub-areas in the first selected state does not reach the first number threshold and the number of sub-areas in the second selected state reaches the second number threshold.

In the embodiments of the present disclosure, the second number threshold is a number threshold for voting operation signals indicating agreeing to the action plan, which is also number threshold for sub-areas in the second selected state. In some embodiments, the second number threshold is proportional to the total number of virtual objects in the target camp, or the sum of the second number threshold and the first number threshold equals the total number of virtual objects in the target camp.

Step 1410. Display a supporting result in response to the number of voting operation signals indicating rejecting the action plan not reaching the first number threshold and a display time of the vote counting area reaching a display time threshold. In this case, the number of sub-areas in the first selected state does not the first number threshold.

In the embodiments of the present disclosure, because a user who is busy playing a MOBA game may make no response when agreeing to the action plan, when the number of sub-areas in the first state does not reach the first number threshold and the display time of the vote counting area reaches the time threshold, it may be determined that most of the virtual objects in the default target camp agree to the action plan. In this case, the supporting result state that the action plan was passed because most of the virtual objects did not vote.

Step 1411. Display a virtual map, the virtual map including an action object identifier, and the action object identifier being used for marking a position of an action target object.

In the embodiments of the present disclosure, when the voting result is the supporting result, the virtual objects in the camp execute the action plan. The action plan corresponds to an action target object, and the action target object is an object targeted by the action plan. The action target object may be a virtual object in the virtual environment, or a virtual prop in the virtual environment, or a virtual creature in the virtual environment. The type of the target object is not limited in the embodiments of the present disclosure.

Figure 18:
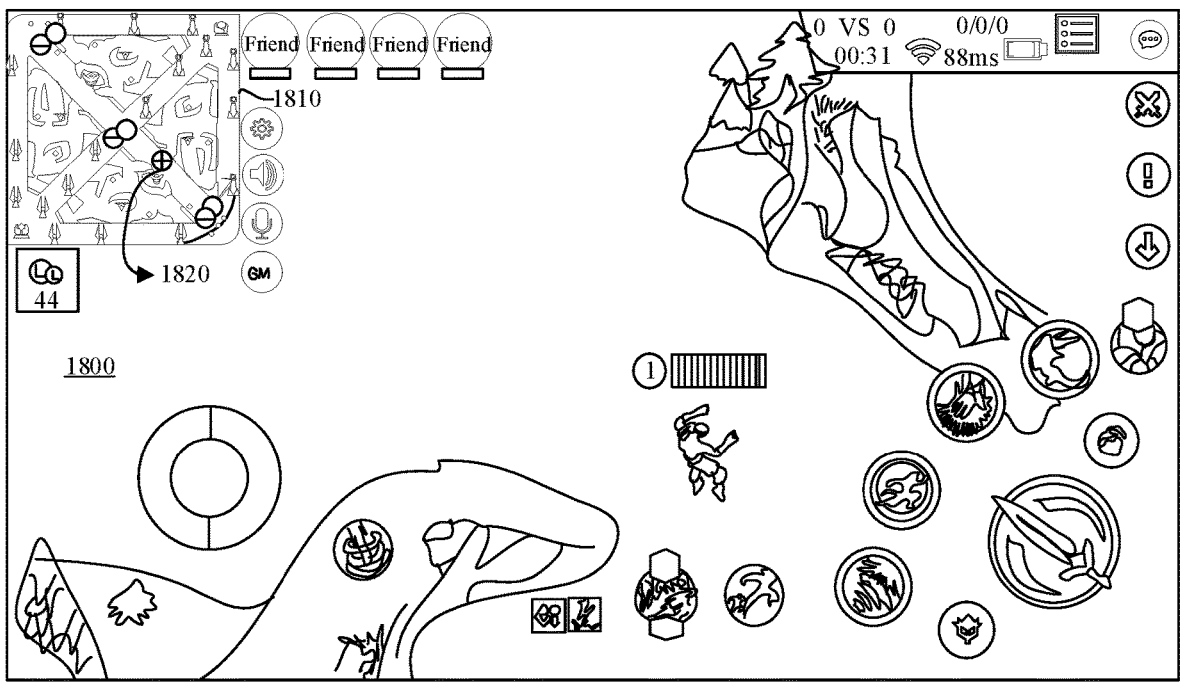
FIG. 18 is a schematic diagram of a virtual game screen having a virtual map according to an exemplary embodiment of the present disclosure.

Referring to FIG. 18, a virtual map 1810 is displayed in a virtual game screen 1800. In the virtual map, a position of an action target object is marked with an action object identifier 1820, to provide guidance for the virtual objects.

In the embodiments of the present disclosure, a virtual path may also be displayed in the virtual game screen, to provide guidance regarding the corresponding action plan for the virtual objects in the target camp.

To sum up, according to the method provided by the embodiments of the present disclosure, the vote counting area is displayed corresponding to the action plan, and when voting signals are received, voting options selected by target virtual objects are displayed in the sub-areas based on the voting signals, and a voting result is further displayed. The sub-areas in the vote counting area correspond to the virtual objects in the target camp. By displaying support statuses of the virtual objects for the action plan in the sub-areas and finally displaying a voting result for the action plan according to a content in the vote counting area, the efficiency of displaying the final result of voting is improved, thereby improving the players' sense of experience in a virtual game.

In the method provided by the embodiments of the present disclosure, when the voting result is displayed, the state color blocks expressing the support statuses are displayed corresponding to the first object identifiers of the voting virtual objects participating in the voting, so that the voting result of each virtual object can be visually expressed, thereby improving the effectiveness and efficiency of display.

In the method provided by the embodiments of the present disclosure, when an action plan is proposed, the virtual object that proposes the action plan is displayed, so that the players can judge the feasibility of the action plan according to a display characteristic of the virtual object in the virtual game, which improves the accuracy of the final voting result, thereby further improving the players' sense of experience in the virtual game.

In the method provided by the embodiments of the present disclosure, to prompt the user to vote, after the vote counting area is displayed, the vote counting area is highlighted, and at the same time, the virtual environment screen except the vote counting area is grayscaled, and the display brightness of the virtual environment screen except the vote counting area is decreased, so as to enhance the display of the vote counting area. In this way, users can accurately know the occurrence of the voting event according to the comparison shown on the screen, thereby improving the efficiency of human-machine interaction.

In the method provided by the embodiments of the present disclosure, the vote counting area is displayed in the form of a progress bar, so that the completion status of the current voting event is expressed by the progress displayed by the progress bar, and the voting trend is expressed by color, which improves the display efficiency and improves the efficiency of human-machine interaction.

The method provided by the embodiments of the present disclosure, the remaining voting time for the action plan is visually displayed, which allows players to be aware of the remaining time, thereby further improving the efficiency of voting by players and improving the players' sense of experience in the virtual game.

In the method provided by the embodiments of the present disclosure, when the voting result is the supporting result, the position of the action target object corresponding to the action plan is displayed on the virtual map based on the voting result. In this way, the efficiency of displaying the final voting result is further improved.

Figure 19:
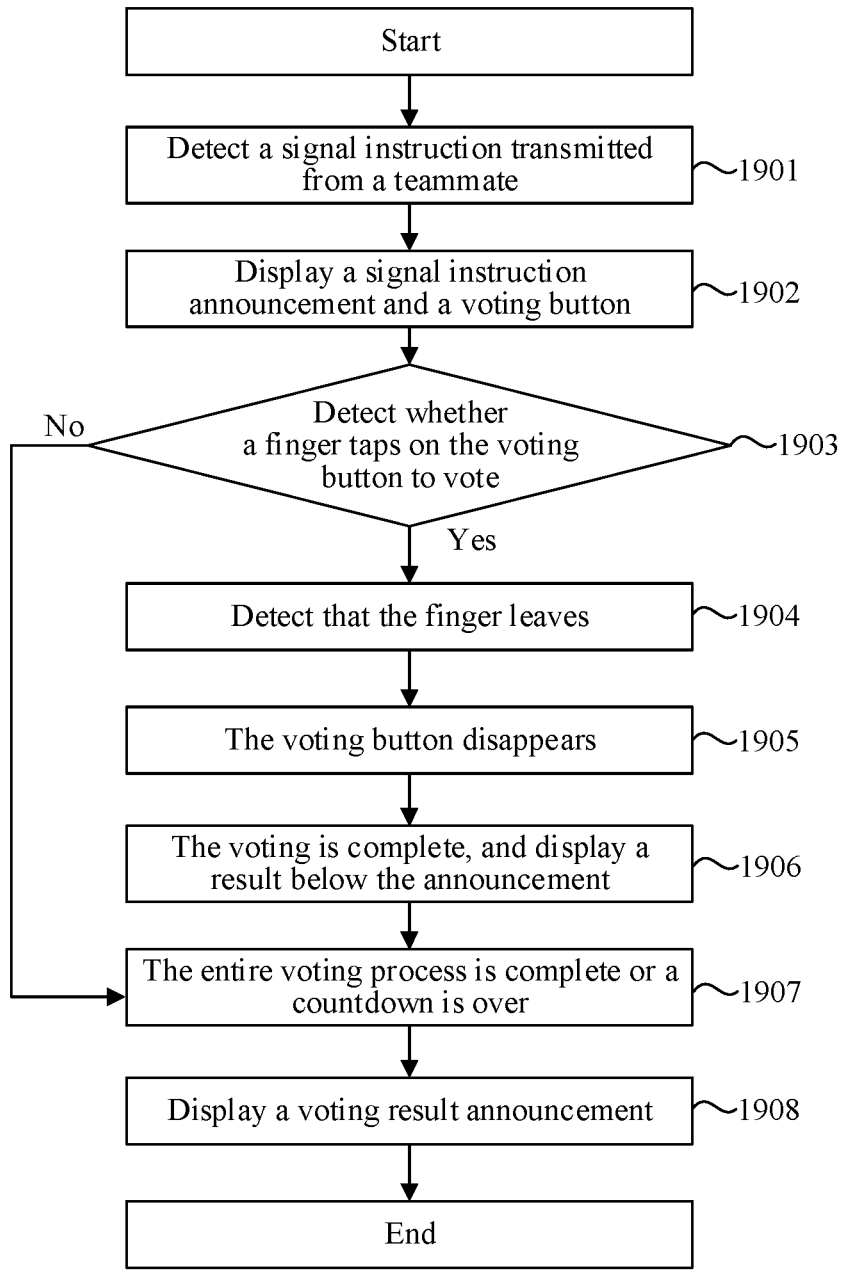
FIG. 19 is a process flowchart of a method for displaying a voting result according to an exemplary embodiment of the present disclosure.

FIG. 19 is a process flowchart of a method for displaying a voting result according to an exemplary embodiment of the present disclosure. This process includes:

Step 1901. Detect a signal instruction transmitted from a teammate.

This process is a process of receiving a voting initiating signal from an initiating object who initiates an action plan. In some embodiments, the signal instruction is transmitted by a first terminal to a server, and forwarded by the server to other terminals.

Step 1902. Display a signal instruction announcement and a voting button.

This process is a process of displaying the action plan and voting options corresponding to the action plan on the virtual game screen. In some embodiments, the action plan is a plan carried in the signal instruction in step 1901, and the action plan is displayed in the virtual game screen in the form of visual text.

Step 1903. Detect whether a finger taps on the voting button to vote.

This process is a process of determining whether a selection operation is received. In an embodiment of the present disclosure, the selection operation is a pressing operation on the voting option. Corresponding to the selection operation, sub-areas are displayed in a vote counting area in the virtual game screen.

When a tap is detected, step 1904 is performed.

Step 1904. Detect that the finger leaves.

This process is a process of triggering the selection operation.

Step 1905. The voting button disappears.

This process is a process in which the terminal receives the selection operation. In the terminal corresponding to the target virtual object, displaying of the voting option is canceled after the voting ends.

Step 1906. The voting is complete, and display a result below the announcement.

In this embodiment of the present disclosure, the vote counting area is located below the action plan, and the vote counting area includes sub-areas in a selected state and sub-areas in a to-be-selected state.

Step 1907. The entire voting process is complete or a countdown is over.

In some embodiments, when a tap is detected, step 1907 is also executed.

This process is a process of ending the voting when the current voting situation meets a voting result display condition. In the embodiments of the present disclosure, a countdown timer is set corresponding to the action plan to ensure the timeliness of the action plan.

Step 1908. Display a voting result announcement.

This process is a process of displaying the voting result. In an embodiment of the present disclosure, the voting result includes a supporting result or a rejection result.

To sum up, according to the method provided by the embodiments of the present disclosure, the vote counting area is displayed corresponding to the action plan, and when voting signals are received, voting options selected by target virtual objects are displayed in the sub-areas based on the voting signals, and a voting result is further displayed. The sub-areas in the vote counting area correspond to the virtual objects in the target camp. By displaying support statuses of the virtual objects for the action plan in the sub-areas and finally displaying a voting result for the action plan according to a content in the vote counting area, the efficiency of displaying the final result of voting is improved, thereby improving the players' sense of experience in a virtual game.

Figure 20:
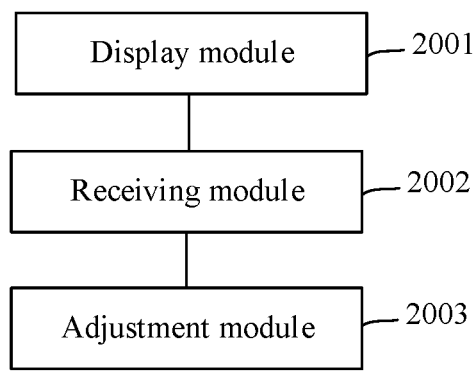
FIG. 20 is a structural block diagram of an apparatus for displaying a voting result according to an exemplary embodiment of the present disclosure.

FIG. 20 is a structural block diagram of an apparatus for displaying a voting result according to an exemplary embodiment of the present disclosure. As shown in FIG. 20, the apparatus includes:

- a receiving module 2002, configured to receive a selection operation signal for an action plan from a virtual object in a target camp;
- a display module 2001, configured to display a vote counting area corresponding to the action plan in an interface of the terminal device, the vote counting area being used for displaying voting on the action plan, and the vote counting area including sub-areas in a to-be-selected state;

the receiving module 2002 being further configured to receive a voting operation signal for the action plan, the voting operation signal indicating a support status for the action plan; and an adjustment module 2003, configured to analyze the voting operation signal, and adjust the sub-area from the to-be-selected state to a selected state according to a result of the analysis, a display characteristic of the selected state being corresponding to the support status;

the display module 2001 being further configured to display a voting result corresponding to the action plan based on the voting operation signal.

In one embodiment, the selected state includes a first selected state or a second selected state, wherein the first selected state indicates rejecting the action plan, and the second selected state indicates agreeing to the action plan; and the display module 2001 is further configured to display a rejection result in response to a number of voting operation signals indicating rejecting the action plan reaching a first number threshold, the rejection result indicating that the target camp does not execute the action plan; or the display module 2001 is further configured to display a supporting result in response to a number of voting operation signals indicating agreeing to the action plan reaching a second number threshold, the supporting result indicating that team members of the target camp agree on executing the action plan.

In one embodiment, the display module 2001 is further configured to display the supporting result in response to the number of voting operation signals indicating rejecting the action plan not reaching the first number threshold and the number of sub-areas in the second selected state reaching the second number threshold in the vote counting area.

In one embodiment, the vote counting area includes a selection progress bar, and the sub-areas are progress blocks in the selection progress bar; and the adjustment module 2003 is further configured to analyze the voting operation signal, and adjust the sub-area in the selection progress bar from a candidate color to a selected color according to a result of the analysis, the candidate color being corresponding to the to-be-selected state, and the selected color being corresponding to the support status.

In one embodiment, the voting operation signal corresponds to a voting virtual object; and the adjustment module 2003 is further configured to adjust the sub-area corresponding to the voting virtual object in the selection progress bar from the candidate color to the selected color according to the result of the analysis, a correspondence between the sub-areas in the selection progress bar and virtual objects is preset; or adjust the sub-area which is the first sub-area displayed as the candidate color in the progress bar to the selected color according to the result of the analysis.

In one embodiment, the voting operation signal corresponds to a voting virtual object; and the display module 2001 is further configured to display a first object identifier and a state color block in the sub-area in response to the voting operation signal, the first object identifier indicating the voting virtual object, and the state color block indicating the selected state of the sub-area.

In one embodiment, the state color block is displayed around a periphery of the first object identifier; or the first object identifier is overlay-displayed on the state color block.

In one embodiment, the action plan corresponds to a plan initiating object, and the plan initiating object is a virtual object that initiates the action plan;

the display module 2001 is further configured to display an action plan; and the display module 2001 is further configured to display a second object identifier on a periphery of the action plan, the second object identifier indicating the plan initiating object.

In one embodiment, after displaying the vote counting area for the action plan, the display module 2001 increases a display brightness of the vote counting area, and at the same time, increases a display grayscale of the virtual environment screen and decreases a display brightness of the virtual environment screen.

In another embodiment, the display module 2001 is further configured to display a remaining voting display duration on a periphery of the vote counting area, the remaining voting display duration indicating a remaining time for which the target camp expresses a support status for the action plan.

To sum up, according to the apparatus for displaying a voting result provided by the embodiments of the present disclosure, the vote counting area is displayed corresponding to the action plan, and when voting signals are received, voting options selected by target virtual objects are displayed in the sub-areas based on the voting signals, and a voting result is further displayed. The sub-areas in the vote counting area correspond to the virtual objects in the target camp. By displaying support statuses of the virtual objects for the action plan in the sub-areas and finally displaying a voting result for the action plan according to a content in the vote counting area, the efficiency of displaying the final result of voting is improved, thereby improving the players' sense of experience in a virtual game.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The apparatus for displaying a voting result provided in the foregoing embodiments is illustrated with an example of division of the foregoing functional modules. In actual application, the functions may be allocated to and completed by different functional modules according to requirements, that is, the internal structure of the device is divided into different functional modules, to implement all or some of the contents described above.

The present disclosure further provides a terminal, including a processor and a memory, the memory storing at least one instruction, the at least one instruction being loaded and executed by the processor to implement the steps executed by the first terminal or the steps executed by the second terminal in the method for displaying a voting result according to the foregoing method embodiments. The terminal may be a terminal provided in FIG. 21 below.

Figure 21:
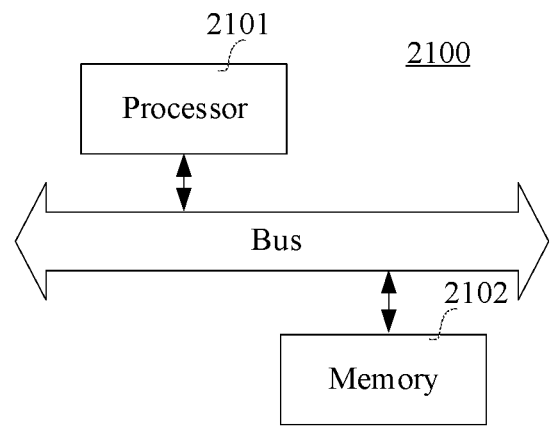
FIG. 21 is a structural block diagram of a terminal according to an exemplary embodiment of the present disclosure.

FIG. 21 shows a structural block diagram of a terminal 2100 according to an exemplary embodiment of the present disclosure. The terminal 2100 may be a smartphone, a tablet computer, a Moving Picture Experts Group Audio Layer III (MP3) player, a Moving Picture Experts Group Audio Layer IV (MP4) player, a notebook computer, or a desktop computer. The terminal 2100 may also be referred to as a user equipment, a portable terminal, a laptop terminal, a desktop terminal, or other names.

Generally, the terminal 2100 includes a processor 2101 and a memory 2102.

The processor 2101 may include one or more processing cores, and may be, for example, a 4-core processor or an 8-core processor.

The memory 2102 may include one or more computer-readable storage media that may be non-transitory.

A person skilled in the art may understand that the structure shown in FIG. 21 does not constitute a limitation to the terminal 2100, and the terminal may include more or fewer components than those shown in the figure, or some components may be combined, or a different component arrangement may be used.

The memory further includes one or more programs. The one or more programs are stored in the memory. The one or more programs include a program for performing the method for displaying a voting result provided in the embodiments of the present disclosure.

The present disclosure further provides a computer-readable storage medium, the storage medium storing at least one instruction, the at least one instruction being loaded and executed by a processor to implement the method for displaying a voting result according to the foregoing method embodiments.

The present disclosure further provides a computer program product or a computer program. The computer program product or the computer program includes computer instructions, the computer instructions being stored in a computer-readable storage medium. A processor of the computer device reads the computer instructions from the computer-readable storage medium and executes the computer instructions to cause the computer device to perform the method for displaying a voting result according to any one of the foregoing embodiments of the present disclosure.

What is claimed is:

1. A method for displaying a voting result, executed by a terminal device, the method comprising:
   receiving a selection operation signal for an action plan from a virtual object in a target camp of a game, wherein the action plan relates to a gaming action and corresponds to a plan initiating object, and the plan initiating object is a player of the game that initiates the action plan;
   displaying the action plan in a graphical interface of the terminal device;
   displaying a second object identifier on a periphery of the action plan, the second object identifier indicating the plan initiating object;
   displaying a vote counting area corresponding to the action plan in the graphical interface of the terminal device, wherein the vote counting area presents voting status on the action plan, and the vote counting area comprising sub-areas in a to-be-selected state;
   receiving a voting operation signal for the action plan, the voting operation signal indicating a support status for the action plan;
   adjusting one of the sub-areas from the to-be-selected state to a selected state with a display characteristic corresponding to the support status according to the voting operation signal, wherein different support status corresponds to different display characteristics for the sub-areas; and
   displaying a voting result corresponding to the action plan based on the voting operation signal.

2. The method according to claim 1, wherein the selected state comprises a first selected state or a second selected state, wherein the first selected state indicates rejecting the action plan, and the second selected state indicates agreeing to the action plan.

3. The method according to claim 1, wherein the displaying a voting result corresponding to the action plan based on the voting operation signal comprises:
   displaying a rejection result in response to a number of voting operation signals indicating rejecting the action plan reaching a first number threshold, the rejection result indicating that the target camp does not execute the action plan; or
   displaying a supporting result in response to a number of voting operation signals indicating agreeing to the action plan reaching a second number threshold, the supporting result indicating that team members of the target camp agree on executing the action plan.

4. The method according to claim 3, wherein the method further comprises:
   displaying the supporting result in response to the number of voting operation signals indicating rejecting the action plan not reaching the first number threshold and the number of voting operation signals indicating agreeing to the action plan reaching the second number threshold.

5. The method according to claim 1, wherein the vote counting area comprises a selection progress bar, and the sub-areas are progress blocks in the selection progress bar; and
   the adjusting one of the sub-areas from the to-be-selected state to a selected state with a display characteristic corresponding to the support status according to the voting operation signal comprises:
   adjusting the one of the sub-areas in the selection progress bar from a candidate color to a selected color according to the voting operation signal, the candidate color being corresponding to the to-be-selected state, and the selected color being corresponding to the support status.

6. The method according to claim 5, wherein the voting operation signal corresponds to a voting virtual object; and
   the adjusting the one sub-area in the selection progress bar from a candidate color to a selected color comprises:
   adjusting the one sub-area corresponding to the voting virtual object in the selection progress bar from the candidate color to the selected color according to the result of the analysis, a correspondence between the sub-areas in the selection progress bar and virtual objects is preset; or
   adjusting the sub-area which is the first sub-area displayed as the candidate color in the progress bar to the selected color according to the result of the analysis.

7. The method according to claim 1, wherein the voting operation signal corresponds to a voting virtual object; and
   the adjusting one of the sub-areas from the to-be-selected state to a selected state with a display characteristic corresponding to the support status according to the voting operation signal comprises:
   displaying a first object identifier and a state color block in the sub-area in response to the voting operation signal, the first object identifier indicating the voting virtual object, and the state color block indicating the selected state of the sub-area.

8. The method according to claim 7, wherein
the state color block is displayed around a periphery of the first object identifier; or
the first object identifier is overlay-displayed on the state color block.

9. The method according to claim 1, wherein after the displaying a vote counting area corresponding to the action plan in the graphical interface of the terminal device, the method further comprises:
increasing a display brightness of the vote counting area, and at the same time, increasing a display grayscale of the virtual environment screen and decreasing a display brightness of the virtual environment screen.

10. The method according to claim 1, wherein the method further comprises:
displaying a remaining voting display duration on a periphery of the vote counting area, the remaining voting display duration indicating a remaining time for which a member of the target camp expresses a support status for the action plan.

11. The method according to claim 1, further comprising:
receiving a first voting operation signal for the action plan and adjusting a first sub-area of the sub-areas from the to-be-selected state to the selected state according to the first voting operation signal;
receiving a second voting operation signal for the action plan and adjusting a second sub-area of the sub-areas from the to-be-selected state to the selected state according to the second voting operation signal,
wherein the first sub-area and the second sub-area are adjusted at different time points.

12. A virtual object control apparatus, comprising a memory and a processor coupled to the memory, the processor being configured to:
receiving a selection operation signal for an action plan from a virtual object in a target camp of a game, wherein the action plan relates to a gaming action and corresponds to a plan initiating object, and the plan initiating object is a player of the game that initiates the action plan;
displaying the action plan in a graphical interface of the terminal device;
displaying a second object identifier on a periphery of the action plan, the second object identifier indicating the plan initiating object;
displaying a vote counting area corresponding to the action plan in the graphical interface of the terminal device, wherein the vote counting area presents voting status on the action plan, and the vote counting area comprising sub-areas in a to-be-selected state;
receive a voting operation signal for the action plan, the voting operation signal indicating a support status for the action plan;
adjust one of the sub-areas from the to-be-selected state to a selected state with a display characteristic corresponding to the support status according to the voting operation signal, wherein different support status corresponds to different display characteristics for the sub-areas; and
display a voting result corresponding to the action plan based on the voting operation signal.

13. The apparatus according to claim 12, wherein the selected state comprises a first selected state or a second selected state, wherein the first selected state indicates rejecting the action plan, and the second selected state indicates agreeing to the action plan.

14. The apparatus according to claim 12, wherein the processor is further configured to:
display a rejection result in response to a number of voting operation signals indicating rejecting the action plan reaching a first number threshold, the rejection result indicating that the target camp does not execute the action plan; or
display a supporting result in response to a number of voting operation signals indicating agreeing to the action plan reaching a second number threshold, the supporting result indicating that team members of the target camp agree on executing the action plan.

15. The apparatus according to claim 14, wherein the processor is further configured to display the supporting result in response to the number of voting operation signals indicating rejecting the action plan not reaching the first number threshold and the number of voting operation signals indicating agreeing to the action plan reaching the second number threshold.

16. The apparatus according to claim 12, wherein the vote counting area comprises a selection progress bar, and the sub-areas are progress blocks in the selection progress bar; and
the processor is further configured to adjust the one of the sub-areas in the selection progress bar from a candidate color to a selected color according to the voting operation signal, the candidate color being corresponding to the to-be-selected state, and the selected color being corresponding to the support status.

17. The apparatus according to claim 16, wherein the voting operation signal corresponds to a voting virtual object; and the processor is further configured to:
adjust the sub-area corresponding to the voting virtual object in the selection progress bar from the candidate color to the selected color according to the result of the analysis, a correspondence between the sub-areas in the selection progress bar and virtual objects is preset; or
adjust the sub-area which is the first sub-area displayed as the candidate color in the progress bar to the selected color according to the result of the analysis.

18. The apparatus according to claim 12, wherein the voting operation signal corresponds to a voting virtual object; and
the processor is further configured to display a first object identifier and a state color block in the sub-area in response to the voting operation signal, the first object identifier indicating the voting virtual object, and the state color block indicating the selected state of the sub-area.

19. A non-transitory computer-readable storage medium, storing at least one instruction, at least one program, a code set, or an instruction set, the at least one instruction, the at least one program, the code set, or the instruction set, when being loaded and executed by a processor, causing the processor to implement:
receiving a selection operation signal for an action plan from a virtual object in a target camp of a game, wherein the action plan relates to a gaming action and corresponds to a plan initiating object, and the plan initiating object is a player of the game that initiates the action plan;
displaying the action plan;
displaying a second object identifier on a periphery of the action plan, the second object identifier indicating the plan initiating object;

displaying a vote counting area corresponding to the action plan in an interface of the terminal device, the vote counting area being used for displaying voting on the action plan, and the vote counting area comprising sub-areas in a to-be-selected state;

receiving a voting operation signal for the action plan, the voting operation signal indicating a support status for the action plan;

adjusting one of the sub-areas from the to-be-selected state to a selected state with a display characteristic corresponding to the support status according to the voting operation signal, wherein different support status corresponds to different display characteristics for the sub-areas; and displaying a voting result corresponding to the action plan based on the voting operation signal.

\* \* \* \* \*